US010535896B2

(12) United States Patent
Makino et al.

(10) Patent No.: US 10,535,896 B2
(45) Date of Patent: Jan. 14, 2020

(54) SOLID ELECTROLYTE COMPOSITION CONTAINING NONSPHERICAL POLYMER PARTICLES, DISPERSION MEDIUM AND INORGANIC SOLID ELECTROLYTE

(71) Applicant: FUJIFILM Corporation, Tokyo (JP)

(72) Inventors: Masaomi Makino, Kanagawa (JP); Hiroaki Mochizuki, Kanagawa (JP); Katsuhiko Meguro, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 247 days.

(21) Appl. No.: 15/237,845

(22) Filed: Aug. 16, 2016

(65) Prior Publication Data

US 2016/0359195 A1 Dec. 8, 2016

Related U.S. Application Data

(63) Continuation of application No. PCT/JP2015/052561, filed on Jan. 29, 2015.

(30) Foreign Application Priority Data

Feb. 17, 2014 (JP) ................................ 2014-027677
Jan. 27, 2015 (JP) ................................ 2015-013305

(51) Int. Cl.

| | |
|---|---|
| ***H01M 10/056*** | (2010.01) |
| ***H01M 10/0565*** | (2010.01) |
| ***H01M 10/0562*** | (2010.01) |
| ***C08F 220/18*** | (2006.01) |
| ***C08F 226/08*** | (2006.01) |

(Continued)

(52) U.S. Cl.
CPC ....... *H01M 10/0565* (2013.01); *C08F 220/18* (2013.01); *C08F 226/08* (2013.01); *C08G 18/6607* (2013.01); *C08G 18/758* (2013.01); *H01M 10/0525* (2013.01);
(Continued)

(58) Field of Classification Search
None
See application file for complete search history.

(56) References Cited

U.S. PATENT DOCUMENTS 6,506,523 B1 1/2003 Hatazawa et al.
2006/0251956 A1* 11/2006 Kim ........................ H01M 4/62 429/62

(Continued)

FOREIGN PATENT DOCUMENTS

CN 1266540 A 9/2000
CN 1280149 A 1/2001

(Continued)

OTHER PUBLICATIONS

English translation of JP-2005093377-A (Year: 2005).*

(Continued)

*Primary Examiner* — Lucas J. O'Donnell
(74) *Attorney, Agent, or Firm* — Sughrue Mion, PLLC

(57) ABSTRACT

Provided is a solid electrolyte composition including non-spherical polymer particles; a dispersion medium; and an inorganic solid electrolyte, in which the nonspherical polymer particles is formed of a polymer having at least one of a specific functional group, an acidic group having an acid dissociation constant pKa of 14 or less, or a basic group having a conjugate acid pKa of 14 or less.

14 Claims, 3 Drawing Sheets

(51) Int. Cl.
*C08G 18/66* (2006.01)
*C08G 18/75* (2006.01)
*H01M 10/0525* (2010.01)

(52) U.S. Cl.
CPC .................. *H01M 10/0562* (2013.01); *H01M 2300/0068* (2013.01); *H01M 2300/0082* (2013.01)

(56) References Cited

U.S. PATENT DOCUMENTS

| | | | |
|---|---|---|---|
| 2007/0040145 A1 | 2/2007 | Muramoto et al. | |
| 2012/0189910 A1 | 7/2012 | Brune et al. | |
| 2013/0260241 A1 | 10/2013 | Sone et al. | |
| 2014/0093785 A1 | 4/2014 | Sugiura et al. | |
| 2014/0127579 A1* | 5/2014 | Yoshida | H01B 1/122 429/217 |

FOREIGN PATENT DOCUMENTS

| | | | | |
|---|---|---|---|---|
| CN | 1849674 | A | 10/2006 | |
| CN | 102318125 | A | 1/2012 | |
| CN | 103229339 | A | 7/2013 | |
| JP | 10-134820 | A | 5/1998 | |
| JP | 11-086899 | A | 3/1999 | |
| JP | 11-233143 | A | 8/1999 | |
| JP | 2000-100441 | A | 4/2000 | |
| JP | 2000123874 | A | 4/2000 | |
| JP | 2000-294246 | A | 10/2000 | |
| JP | 2002-226513 | A | 8/2002 | |
| JP | 2005093377 | A * | 4/2005 | H01G 11/56 |
| JP | 2010-212058 | A | 9/2010 | |
| JP | 2012-099315 | A | 5/2012 | |
| JP | 2012-243496 | A | 12/2012 | |
| JP | 2013-008611 | A | 1/2013 | |
| JP | 2013-179041 | A | 9/2013 | |
| KR | 10-2013-0020938 | A | 3/2013 | |
| WO | 2011/105574 | A1 | 9/2011 | |

OTHER PUBLICATIONS

Essential Chemical Industry Online Polyurethane Profile University of York, 2013 (Year: 2013).*

Communication dated Feb. 28, 2017 from the State Intellectual Property Office of the P.R.C. in counterpart Application No. 201580008823.1.

International Search Report of PCT/JP2015/052561 dated Apr. 28, 2015.

Communication dated Dec. 21, 2017 from the Korean Intellectual Property Office in counterpart Korean application No. 10-2016-7024632.

Communication dated May 30, 2018, issued by the Korean Intellectual Property Office in counterpart Korean application No. 10-2016-7024632.

* cited by examiner

SOLID ELECTROLYTE COMPOSITION CONTAINING NONSPHERICAL POLYMER PARTICLES, DISPERSION MEDIUM AND INORGANIC SOLID ELECTROLYTE

CROSS-REFERENCE TO RELATED APPLICATIONS

This application is a Continuation of PCT International Application No. PCT/JP2015/052561 filed on Jan. 29, 2015, which claims priority under 35 U.S.C. § 119 (a) to Japanese Patent Application No. 2014-027677 filed on Feb. 17, 2014, and to Japanese Patent Application No. 2015-013305 filed on Jan. 27, 2015. Each of the above applications is hereby expressly incorporated by reference, in its entirety, into the present application.

BACKGROUND OF THE INVENTION

1. Field of the Invention

The present invention relates to a solid electrolyte composition, an electrode sheet for a battery and an all-solid-state secondary battery in which the solid electrolyte composition is used, and a method for manufacturing the solid electrolyte composition.

2. Description of the Related Art

An electrolyte solution is used in a lithium ion battery which is widely used currently in many cases. There has been an attempt to cause all configuration materials to be solid by substituting the electrolyte solution with a solid electrolyte. Above all, one of the advantages of the technique of using an inorganic solid electrolyte is reliability. As a medium of the electrolyte solution, a combustible material such as a carbonate-based solvent is applied as a medium of the electrolyte solution which is used in the lithium ion secondary battery. Various measures are employed, but an additional measurement to be performed when a battery is overcharged is desired. An all-solid-state secondary battery formed of an inorganic compound that can cause an electrolyte to be incombustible is regarded as solving means thereof.

Another advantage of the all-solid-state secondary battery is that a high energy density is suitably achieved by stacking electrodes. Specifically, the all-solid-state secondary battery can be a battery having a structure in which electrodes and electrolytes are directly arranged side by side to be serialized. At this point, a metal package that seals battery cells and a copper wire or a bus bar that connects battery cells can be omitted, and thus an energy density of the battery can be greatly increased. It is advantageous that good compatibility with a positive electrode material in which a potential can be enhanced to a high level is good.

According to the respective advantages as described above, the development of the all-solid-state secondary battery as a next-generation lithium ion secondary battery is energetically advanced (see NEDO: New Energy and Industrial Technology Development Organization, Fuel Cells•Hydrogen Technology Development Field, Electricity Storage Technology Development Division "NEDO 2008 Roadmap for the Development of Next Generation Automotive Battery Technology" (June 2009)). Meanwhile, the inorganic all-solid-state secondary battery has a disadvantage caused by the fact that the electrolyte thereof is a hard solid. Examples thereof include increase of resistance on an interface between solid particles (solid electrolytes). In order to improve this, there are examples in which various polymer compounds are used as binders. Specifically, in JP2013-008611A and WO2011/105574A, styrene-acryl-based copolymers are used. JP1999-086899A (JP-H11-086899A) discloses the use of a hydrogenated butadiene copolymer, and JP2012-99315A discloses the use of a polyolefin-based polymer.

SUMMARY OF THE INVENTION

It is considered that, according to the research in JP2013-008611A, WO2011/105574A, JP1999-086899A (JP-H11-086899A), and JP2012-99315A described above, the increase of the interface resistance in the all-solid-state secondary battery can be improved to some extent. However, the binders consisting of the polymer compounds disclosed in JP2013-008611A, WO2011/105574A, and JP1999-086899A (JP-H11-086899A) described above may not satisfy the high level required recently and further improvement is required.

Therefore, an object of the invention is to provide a solid electrolyte composition that can prevent the decrease of the ion conductance and that can realize the favorable binding properties, without pressurization in the all-solid-state secondary battery, and an electrode sheet for a battery and an all-solid-state secondary battery using the same, and a method for manufacturing the electrode sheet for a battery and the all-solid-state secondary battery.

The objects above are achieved by the following means.

[1] A solid electrolyte composition comprising:

nonspherical polymer particles;

a dispersion medium; and an inorganic solid electrolyte, in which the nonspherical polymer particles are formed of a polymer having at least one of a functional group selected from a group of functional groups a below, an acidic group having an acid dissociation constant pKa of 14 or less, or a basic group having a conjugate acid pKa of 14 or less, in which the group of functional groups a indicates the substituent or the linking group below, in which the substituent is a carboxyl group, a sulfonic acid group, a phosphoric acid group, a hydroxy group, $CONR^N_2$, a cyano group, $NR^N_2$, or a thiol group, in which a linking group is a carbonyloxy group, a carbonyl group, $NR^N$, S, O, $CONR^N$, OCOO, $NR^N$-COO, or a urea group, and in which $R^N$ represents a hydrogen atom, an alkyl group, or an aryl group.

[2] The solid electrolyte composition according to [1], in which a glass transition temperature of the nonspherical polymer particles is −50° C. to 50° C.

[3] The solid electrolyte composition according to [1] or [2], in which a polymer for forming the nonspherical polymer particles has a polyalkylene oxide chain, a polycarbonate chain, a polyester chain, or a polysiloxane chain of which a weight average molecular weight is 200 or greater.

[4] The solid electrolyte composition according to any one of [1] to [3], in which the polymer for forming the nonspherical polymer particles has a crosslinkable group.

[5] The solid electrolyte composition according to any one of [1] to [4], in which the polymer for forming the nonspherical polymer particles includes a repeating unit of Formula (1) or (2) below, and

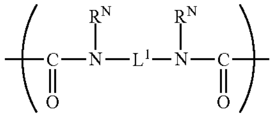

(1)

$$-(X-L^2-X)-$$

(2)

in which $L^1$ represents an alkylene group having 1 to 20 carbon atoms or an arylene group having 6 to 22 carbon atoms, $L^2$ represents an alkylene group that may have a linking group having a heteroatom interposed therebetween or an arylene group that may have a linking group having a heteroatom interposed therebetween, X represents O, CO, S, $NR^N$, and a combination thereof, and $R^N$ represents a hydrogen atom, an alkyl group, or an aryl group.

[6] The solid electrolyte composition according to any one of [1] to [5], in which a boiling point of the dispersion medium at a normal pressure is 80° C. to 220° C.

[7] The solid electrolyte composition according to any one of [1] to [6], in which solubility of the dispersion medium in water is 5 mass % or less at 20° C.

[8] The solid electrolyte composition according to any one of [1] to [7], in which flatness of the nonspherical polymer particles is 1.1 or greater.

[9] The solid electrolyte composition according to any one of [1] to [8], in which a particle variation D of the nonspherical polymer particles is 2 or greater.

[10] The solid electrolyte composition according to any one of [1] to [9], in which a content of the nonspherical polymer particles is 0.1 parts by mass to 10 parts by mass with respect to 100 parts by mass of the inorganic solid electrolyte.

[11] The solid electrolyte composition according to any one of [1] to [10], further comprising: an active substance that can insert or release an ion of metal belonging to Group 1 or 2 of the periodic table.

[12] The solid electrolyte composition according to any one of [1] to [11], in which the inorganic solid electrolyte is a sulfide-based inorganic solid electrolyte.

[13] A method for manufacturing a solid electrolyte composition, comprising: a first step of mixing and mechanically dispersing nonspherical polymer particles and a dispersion medium below to form slurry liquid of nonspherical polymer particles; and a second step of further mechanically dispersing a slurry liquid of polymer particles obtained as above in presence of an inorganic solid electrolyte, in which the nonspherical polymer particles is formed of a polymer having at least one of a functional group selected from a group of functional groups a below, an acidic group having an acid dissociation constant pKa of 14 or less, or a basic group having a conjugate acid pKa of 14 or less, in which the group of functional groups a indicates the substituent or the linking group below, in which the substituent is a carboxyl group, a sulfonic acid group, a phosphoric acid group, a hydroxy group, $CONR^N_2$, a cyano group, $NR^N_2$, or a thiol group, in which a linking group is a carbonyloxy group, a carbonyl group, $NR^N$, S, O, $CONR^N$, OCOO, $NR^N$-COO, or a urea group, and in which $R^N$ represents a hydrogen atom, an alkyl group, or an aryl group.

[14] The method for manufacturing the solid electrolyte composition according to [13], in which the mechanical dispersion in the first step and/or the second step is performed by a ball mill dispersion method.

[15] An electrode sheet for a battery comprising: the solid electrolyte composition according to any one of [1] to [12].

[16] A method for manufacturing an electrode sheet for a battery, comprising: a third step of applying the solid electrolyte composition according to any one of [1] to [12] to a collector and heating the solid electrolyte composition to a temperature of the glass transition temperature or greater of the nonspherical polymer particles.

[17] An all-solid-state secondary battery comprising: the electrode sheet for a battery according to [15].

In this specification, the numerical range expressed by using the expression "to" means a range including numerical values before and after the expression "to" as the lower limit and the upper limit.

In this specification, when there are plural substituents or linking groups indicated with specific reference symbols, or plural substituents or the like (in the same manner as in the definition of the number of substituents) are simultaneously or alternatively defined, the respective substituents may be identical to or different from each other. When the plural substituents and the like are in vicinity to each other, those may be bonded or condensed to each other to form a ring.

The solid electrolyte composition according to the invention exhibits an excellent effect of preventing the decrease of the ion conductance and realizing the favorable binding properties, without pressurization when being used as materials of the inorganic solid electrolyte layer or the active substance layer of the all-solid-state secondary battery.

The electrode sheet for a battery and the all-solid-state secondary battery according to the invention include the solid electrolyte composition and exhibit the favorable performances above. In the manufacturing method according to the invention, the solid electrolyte composition can be appropriately manufactured.

Aforementioned and additional features and advantages are clearly presented from the following descriptions suitably referring to the accompanying drawings.

DESCRIPTION OF THE PREFERRED EMBODIMENTS

The solid electrolyte composition according to the invention includes an inorganic solid electrolyte and nonspherical polymer particles. Hereinafter, preferred embodiments thereof are described, but, first, an example of the all-solid-state secondary battery which is a preferred application is described.

Figure 1:
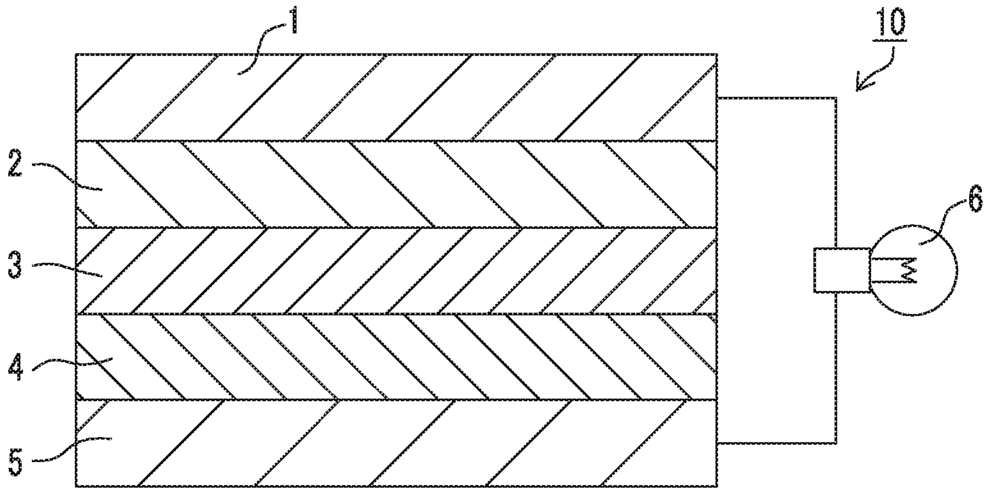
FIG. 1 is a cross-sectional view schematically illustrating an all-solid-state lithium ion secondary battery according to a preferred embodiment of the invention.

FIG. 1 is a sectional view schematically illustrating an all-solid-state secondary battery (lithium ion secondary battery) according to a preferred embodiment of the invention. An all-solid-state secondary battery 10 according to the embodiment includes a negative electrode collector 1, a negative electrode active substance layer 2, an inorganic solid electrolyte layer 3, a positive electrode active substance layer 4, and a positive electrode collector 5, in this sequence, from the negative electrode side. The respective layers are in contact with each other, and form a stacked structure. If this structure is applied, when the battery is charged, electrons ($e^-$) are supplied to a negative electrode side and lithium ions ($Li^+$) are accumulated thereto. Meanwhile, when the battery is discharged, the lithium ions ($Li^+$) accumulated in the negative electrode are returned to the positive electrode side, and electrons are supplied to an operating position 6. In the illustrated example, a bulb is employed in the operating position 6, and the bulb is turned on by the discharge. The solid electrolyte composition according to the invention is preferably used as a configuration material of the negative electrode active substance layer, the positive electrode active substance layer, and the inorganic solid electrolyte layer. Among them, the inorganic solid electrolyte composition according to the invention is preferably used as a configuration material of all of the inorganic solid electrolyte layer, the positive electrode active substance layer, and the negative electrode active substance layer.

Thicknesses of the positive electrode active substance layer 4, the inorganic solid electrolyte layer 3, and the negative electrode active substance layer 2 are not particularly limited, but the thicknesses of the positive electrode active substance layer and the negative electrode active substance layer can be arbitrarily determined according to a desired capacity of a battery. Meanwhile, the inorganic solid electrolyte layer is desirably thinned as possible, while preventing a short circuit of positive and negative electrodes. Specifically, the thickness is preferably 1 μm to 1,000 μm and more preferably 3 μm to 400 μm.

<Solid Electrolyte Composition>

The solid electrolyte composition according to the invention is a composition including an inorganic solid electrolyte and is used as a material of forming an inorganic solid electrolyte layer, a positive electrode active substance layer, and a negative electrode active substance layer of the all-solid-state secondary battery. The solid electrolyte composition is not limited to a solid state, and may be a liquid state or a paste state.

(Inorganic Solid Electrolyte)

The inorganic solid electrolyte of the invention is an solid electrolyte consisting of an inorganic compound. In this specification, the solid electrolyte means a solid-state electrolyte in which ions can move inside thereof. In this point of view, the inorganic solid electrolyte may be called an ion conductive inorganic solid electrolyte in order to differentiate the inorganic solid electrolyte from an electrolyte salt (supporting electrolyte) below.

The ion conductance of the inorganic solid electrolyte is not particularly limited. However, in the lithium ion, the ion conductance of the inorganic solid electrolyte is preferably $1\times10^{-6}$ S/cm or greater, more preferably $1\times10^{-5}$ S/cm or greater, even more preferably $1\times10^{-4}$ S/cm or greater, and particularly preferably $1\times10^{-3}$ S/cm or greater. The upper limit thereof is not particularly limited, but is practically 1 S/cm or less.

Unless described otherwise, a method for measuring ion conductance is performed according to non-pressurization condition measured in the examples below.

The inorganic solid electrolyte is clearly differentiated from a polymer electrolyte represented by organic solid electrolyte or polyethylene oxide (PEO), an organic electrolyte salt represented by lithium bistrifluoromethanesulfonimide (LiTFSI) or the like, since the polymer compound or an organic compound such as a complex salt is not included. Since the inorganic solid electrolyte is a non-dissociative solid in a normal state, the inorganic solid electrolyte is not decomposed or separated to cations and anions even in the liquid. In this point of view, the inorganic solid electrolyte is clearly differentiated from inorganic electrolyte salt [such as $LiPF_6$, $LiBF_4$, lithium bis(fluorosulfonyl)imide [LiFSI], or LiCl] which is decomposed or separated to cations and anions in the electrolysis liquid or the polymer. While the inorganic solid electrolyte include metal belonging to Group 1 or 2 of the periodic table and has conductivity of these metal ions (preferably lithium ions), it is general that the inorganic solid electrolyte does not have electron conductivity.

According to the invention, at least one of the positive electrode active substance layer, the inorganic solid electrolyte layer, or the negative electrode active substance layer contain the inorganic solid electrolyte. The contained inorganic solid electrolyte can be used by suitably selecting a solid electrolyte material applied to the all-solid-state secondary battery. Representative examples of the inorganic solid electrolyte include (i) a sulfide-based inorganic solid electrolyte and (ii) an oxide-based inorganic solid electrolyte.

(i) Sulfide-Based Inorganic Solid Electrolyte

It is preferable that the sulfide-based inorganic solid electrolyte (hereinafter, simply referred to as a "sulfide-based solid electrolyte") contains a sulfur atom (S), has metal belonging to Group 1 or 2 in the periodic table, has ion conductivity, and has electron insulation properties. Examples thereof include a lithium ion conductive inorganic solid electrolyte satisfying the composition presented in Formula (A) below.

$$Li_aM_bP_cS_d \quad \text{Formula (A)}$$

In Formula (A), M represents an element selected from B, Zn, Si, Cu, Ga, and Ge. a to d represent composition ratios of the respective elements, and a:b:c:d satisfies 1 to 12:0 to 1:1:2 to 9, respectively.

In Formula (A), in the composition ratios of Li, M, P, and S, it is preferable that b is 0. It is more preferable that b is 0, and the composition ratio of a, c, and d is a:c:d=1 to 9:1:3 to 7. It is even more preferable that b is 0, and a:c:d=1.5 to 4:1:3.25 to 4.5. As described below, the composition ratios of the respective elements can be controlled by adjusting the blending amount of the raw material compound when the sulfide-based solid electrolyte is manufactured.

The sulfide-based solid electrolyte may be amorphous (glass) or may be crystallized (formed into glass ceramic), or a portion thereof may be crystallized.

In Li—P—S-based glass and Li—P—S-based glass ceramics, the ratio of $Li_2S$ and $P_2S_5$ is preferably 65:35 to 85:15 and more preferably 68:32 to 75:25 in the molar ratio of $Li_2S:P_2S_5$. If the ratio of $Li_2S$ and $P_2S_5$ is in the range described above, lithium ion conductance can be increased.

Specifically, the lithium ion conductance can be preferably $1\times10^{-4}$ S/cm or higher and more preferably $1\times10^{-3}$ S/cm or higher.

Examples of these compounds include a compound obtained by using a raw material composition containing, for example, $Li_2S$ and sulfide of an element of Groups 13 to 15.

Specific examples thereof include $Li_2S—P_2S_5$, $Li_2S—GeS_2$, $Li_2S—GeS_2—ZnS$, $Li_2S—Ga_2S_3$, $Li_2S—GeS_2—Ga_2S_3$, $Li_2S—GeS_2—P_2S_5$, $Li_2S—GeS_2—Sb_2S_5$, $Li_2S—GeS_2—Al_2S_3$, $Li_2S—SiS_2$, $Li_2S—Al_2S_3$, $Li_2S—SiS_2—Al_2S_3$, $Li_2S—SiS_2—P_2S_5$, $Li_2S—SiS_2—Li_4SiO_4$, $Li_2S—SiS_2—Li_3PO_4$, and $Li_{10}GeP_2S_{12}$. Among these, a crystalline and/or amorphous raw material composition formed of $Li_2S—P_2S_5$, $Li_2S—GeS_2—Ga_2S_3$, $Li_2S—GeS_2—P_2S_5$, $Li_2S—SiS_2—P_2S_5$, $Li_2S—SiS_2—Li_4SiO_4$, and $Li_2S—SiS_2—Li_3PO_4$ is preferable, since the crystalline and/or amorphous raw material composition has high lithium ion conductivity.

Examples of the method for synthesizing a sulfide solid electrolyte material by using such a raw material composition include an amorphizing method. Examples of the amorphizing method include a mechanical milling method and a melt quenching method, and among these, a mechanical milling method is preferable, because a treatment in room temperature becomes possible, and thus the manufacturing step is simplified.

The sulfide solid electrolyte can be synthesized with reference to non patent documents, T. Ohtomo, A. Hayashi, M. Tatsumisago, Y. Tsuchida, S. Hama, K. Kawamoto, Journal of Power Sources, 233, (2013), pages 231 to 235 and A. Hayashi, S. Hama, H. Morimoto, M. Tatsumisago, T. Minami, Chem. Lett., (2001), pages 872 to 873.

(ii) Oxide-Based Inorganic Solid Electrolyte

It is preferable that the oxide-based inorganic solid electrolyte (hereinafter, referred to as an oxide-based solid electrolyte) contains an oxygen atom (O), has metal belonging to Group 1 or 2 in the periodic table, has ion conductivity, and has electron insulation properties.

Specific examples of the compound include $Li_{xa}La_{ya}TiO_3$ [xa=0.3 to 0.7, ya=0.3 to 0.7](LLT), $Li_7La_3Zr_2O_{12}$(LLZ), $Li_{3.5}Zn_{0.25}GeO_4$ having a lithium super ionic conductor (LISICON)-type crystal structure, $LiTi_2P_3O_{12}$ and $Li_{1+xb+yb}(Al,Ga)_{xb}(Ti,Ge)_{2-xb}Si_{yb}P_{3-yb}O_{12}$ (here, $0\leq xb\leq 1$, $0\leq yb\leq 1$) having a natrium super ionic conductor (NASICON)-type crystal structure, and $Li_7La_3Zr_2O_{12}$ having a garnet-type crystal structure.

A phosphorus compound including Li, P, and O is also preferable. Examples of the phosphorus compound include lithium phosphate ($Li_3PO_4$), and LiPON or LiPOD (D represents at least one type selected from Ti, V, Cr, Mn, Fe, Co, Ni, Cu, Zr, Nb, Mo, Ru, Ag, Ta, W, Pt, or Au) in which a portion of oxygen atoms in lithium phosphate is substituted with nitrogen atoms. LiAON (A represents at least one type selected from Si, B, Ge, Al, C, or Ga) and the like can be preferably used.

Among these, $Li_{1+xb+yb}(Al,Ga)_{xb}(Ti,Ge)_{2-xb}Si_{yb}P_{3-yb}O_{12}$ (here, $0\leq xb\leq 1$ and $0\leq yb\leq 1$) is preferable, because $Li_{1+xb+yb}(Al,Ga)_{xb}(Ti,Ge)_{2-xb}Si_{yb}P_{3-yb}O_{12}$ have high lithium ion conductivity, are chemically stable, and are easily managed. These may be used singly or two or more types thereof may be used in combination.

The lithium ion conductance of the oxide-based solid electrolyte is preferably $1\times10^{-6}$ S/cm or greater, more preferably $1\times10^{-5}$ S/cm or greater, and even more preferably $5\times10^{-5}$ S/cm or greater.

Since the oxide-based inorganic solid electrolyte has an oxygen atom in the structure thereof, it is preferable to use a polymer having high bonding properties. In this point of view, in the polymer for forming nonspherical particles, it is preferable to include a group of functional groups a below, an acidic group, or a basic group. Accordingly, the polymer more strongly adheres to the inorganic solid electrolyte particles, and more favorable properties in the decrease of the interface resistance can be obtained.

The inorganic solid electrolyte may be used singly or two or more types thereof may be used in combination.

The average particle diameter of the inorganic solid electrolyte is not particularly limited, but the average particle diameter is preferably 0.01 μm or longer and more preferably 0.1 μm or longer. The upper limit thereof is preferably 100 μm or shorter and more preferably 50 μm or shorter.

When compatibility between battery performances and a decrease and maintenance effect of the interface resistance is considered, the concentration of the inorganic solid electrolyte in the solid electrolyte composition is preferably 50 mass % or more, more preferably 70 mass % or more, and particularly preferably 90 mass % or more with respect to 100 mass % of the solid component. In the same point of view, the upper limit of the concentration is preferably 99.9 mass % or less, more preferably 99.5 mass % or less, and particularly preferably 99.0 mass % or less. However, when the inorganic solid electrolyte is used together with the positive electrode active substance or the negative electrode active substance described below, it is preferable that the sum thereof is in the concentration range described above.

(Nonspherical Polymer Particles)

Figure 2:
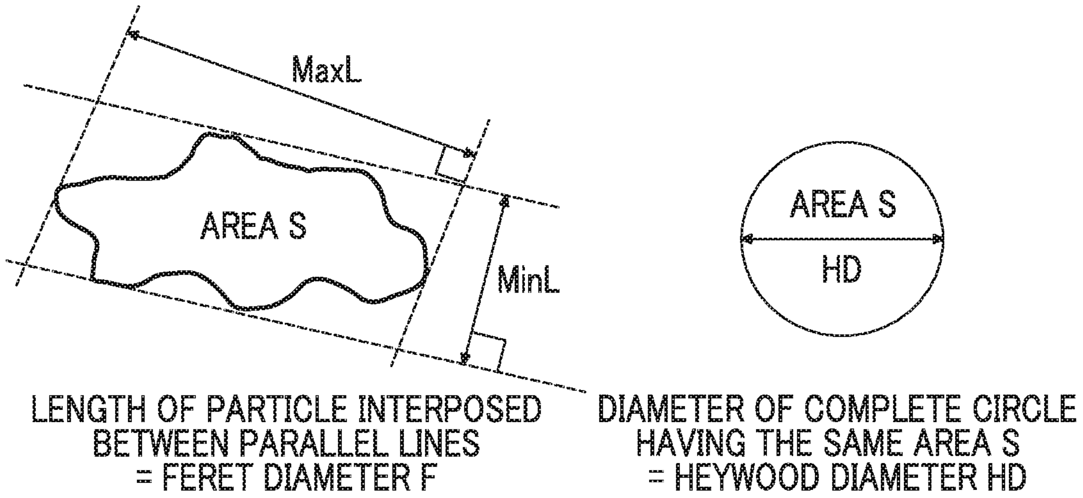
FIG. 2 is a cross-sectional view schematically illustrating cross sections of nonspherical particles in order to describe flatness.
Figure 3:
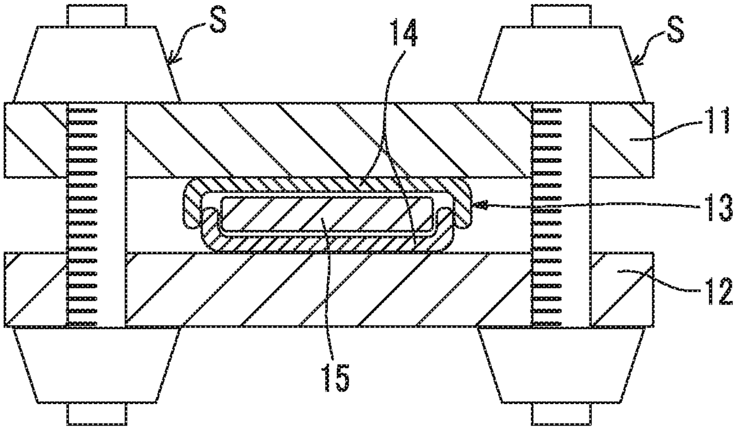
FIG. 3 is a cross-sectional view schematically illustrating a test device used in examples.

The form of the nonspherical polymer particles of the invention is not particularly limited. However, if an example of the nonspherical particles is schematically illustrated, the cross section or a projective diagram thereof is as illustrated in FIG. 2 (left). The shape of the nonspherical particles is not particularly limited, as long as the shape is not spheroidal. However, typically, as illustrated in the projective diagram, examples thereof include long and flat particles.

Here, with reference to "Technique for measuring degree of dispersion" on page 525, No. 8, volume 56 (1983) of the Journal of the Society of Rubber Science and Technology, Japan, the dimension of the particles can be defined to (a) to (d) below (see FIG. 2).

(a) Feret diameter F: Length FH between parallel lines in a predetermined direction Length in which Feret diameter F becomes maximum is MaxL Length in which Feret diameter F becomes minimum is MinL (b) Martin diameter M: Length MH of a border line that divides an area into two equal parts (c) Heywood diameter HD:

When a circle having the same area as an area of the particle is considered, the diameter HD of the circle (d) Maximum length MaxL: Maximum length when adjacent two points regardless of the direction are coupled FH (longest length MaxL) of sphere particles=MH=HD is satisfied. The nonspherical particles can be defined as another structure thereof.

According to the invention, when the long axis thereof is defined as MaxL, the short axis thereof is defined as MinL, it is preferable that the flatness thereof (MaxL/MinL) [f1] is greater than 1. The flatness [f1] of the nonspherical polymer particles is preferably 1.1 or greater, more preferably 1.2 or greater, even more preferably 1.3 or greater, further even more preferably 1.5 or greater, and particularly preferably 1.7 or greater. The upper limit is practically 100 or less and more practically 50 or less (see FIG. 2).

According to the invention, the flatness (MaxL/HD) [f2] based on the Feret diameter and Heywood diameter of the nonspherical polymer particles is preferably greater than 1, more preferably 1.1 or greater, even more preferably 1.2 or greater, and particularly preferably 1.3 or greater. The upper limit is practically 100 or less and more practically 50 or less.

The flatness of the polymer particles and the ratio of the Feret diameter and the Heywood diameter according to the invention are not particularly limited and depend on the condition measured in the measurement in the section of examples below.

Specific Polymer

The polymer for forming the nonspherical polymer particles (hereinafter, referred to as the specific polymer) is at least one of a functional group of the group of functional groups a below, an acidic group having an acid dissociation constant pKa of 14 or less, or a basic group having a conjugate acid pKa of 14 or less. Since these groups function as polar groups, these groups form a hydrogen bond, an ion bond, and a covalent bond with surfaces of the active substance or the inorganic solid electrolyte, increase interactions, and, as a result, increase binding properties.

<Group of Functional Groups A>

Substituent: Carboxyl group, sulfonic acid group, phosphoric acid group, hydroxy group, $CONR^N_2$, cyano group, $NR^N_2$, and thiol group Linking group: Carbonyloxy group, carbonyl group, $NR^N$, S, O, OCOO, urethane group ($NR^NCOO$), $CONR^N$, and urea group ($NR^N$—CO—$NR^N$)

$R^N$ is a hydrogen atom, an alkyl group (preferably having 1 to 12 carbon atoms, more preferably having 1 to 6 carbon atoms, and particularly preferably having 1 to 3 carbon atoms), or an aryl group (preferably having 6 to 22 carbon atoms, more preferably having 6 to 14 carbon atoms, and particularly preferably having 6 to 10 carbon atoms).

These functional groups may be provided in a main chain of the polymer or may be provided in a side chain of the polymer.

According to the invention, if the acidic group and/or the basic group is included in the specific polymer, the binding properties are enhanced, and thus it is preferable to include the acidic group and the basic group. As described above, the acidic group and the basic group are even more preferably an acidic group having an acid dissociation constant pKa of 14 or less and a basic group having a conjugate acid pKa of 14 or less, in view of the enhancement of the binding properties. The pKa is more preferably 12 or less, even more preferably 10 or less, and particularly preferably 8 or less. If pKa is in this range, ion interaction with the inorganic solid electrolyte, the active substance, or the collector are increased, and thus binding properties are enhanced.

pKa is one of indexes of quantitatively indicating acid strength and has the same meaning as an acidity constant. Dissociative reaction in which hydrogen ions are released from acid is considered, an equilibrium constant Ka is represented by a negative common logarithm pKa. As pKa is smaller, the acid is stronger. For example, a value calculated by using ACD/Labs (manufactured by Advanced Chemistry Development, Inc.) or the like can be used. Hereinafter, a representative calculation example of a substituent is indicated below.

| Substituent | pKa |
|---|---|
| —COOH | 4.14 |
| —$SO_3H$ | −2.80 |
| —$PO_4H_2$ | 2.12 (Second stage: 7.06) |
| —$NH_3^+$ (pKa of conjugate acid of $NH_2$) | 10.66 |

With respect of the functional group, examples of the acidic group include a carboxyl group, a sulfonic acid group, a phosphoric acid group, and an acetyl acetonate group. Examples of the basic group include a nitrile group, an amino group ($NR^N_2$), an amide group ($CONR^N_2$), a urethane group ($NR^NCOO$), and a urea group ($NR^N$—CO—$NR^N$).

In the group of functional groups (a), in order to enhance the ion conductance, an ether group, a carbonyl group, a carbonylamino group ($CONR^N$), a carbonyloxy group (COO), and a carbonate group (OCOO) that contribute dissolution of the lithium ion are preferable.

A particularly preferable group among the groups of functional groups (a) is a carbonylamino group ($CONR^N$). A polymer having a carbonylamino group in a polymer main chain is particularly preferable. The polymer having a urea group or an urethane group is included in the polymer having the carbonyl group or the carbonylamino group.

The specific polymer can be obtained by radical polymerization, cation polymerization, and polycondensation reaction. Examples of the polymer that is obtained in the radical polymerization include a polymer having a group derived from a (meth)acryl monomer that may have various substituents as a substructure, a polymer having a group derived from acrylonitrile as a substructure, and a polymer having a group derived from maleimide as a substructure. Examples of the polymer obtained by the cation polymerization include a polymer having a group derived from an epoxy monomer or an oxetane monomer as the substructure. Examples of the polymer obtained by the polycondensation reaction include polyester, polyimide, polyamide, and polyurethane. According to the invention, among these, particularly, an acrylic polymer or polyurethane is most preferable.

The specific polymer preferably has flexiblility and rubber elasticity and even more preferably has a three dimensional crosslinked structure. The three dimensional crosslinkage may be comprised in a stage of synthesized polymer or may have a potential crosslinkable group that can be crosslinked by heat or light. The crosslinkable group may include a radical polymerizable group and a cation polymerizable group. Examples of the radical polymerizable group include a carbon-carbon unsaturated group and specifically include an acryl group, a methacryl group, a vinyl group, an allyl group, a maleimide group, a terminal ethynyl group, an internal ethynyl group, and a propargyl group. Examples of the cation polymerizable group include a hetero ring and specifically include an epoxy group, an oxetanyl group, and an aziridine group. In the stage of the synthesized polymer, examples of the group comprising three dimensional crosslinkage include acrylic rubber, nitrile rubber, urethane rubber, and silicon rubber.

According to the invention, the expression "acryl" widely indicates a structure group having an acryloyl group, and examples thereof include a group including a structure having a substituent at an α position. Here, a group having a methyl group at an α position is called methacryl, and as a meaning of including methacryl, the structure group may called (meth)acryl.

In view of enhancing the ion conductivity, a specific polymer for forming the polymer particles preferably has any one of polymer chains below or a combination thereof.

| | | |
|---|---|---|
| Polyalkylene oxide chain: | $-(L^A\text{-}O)n-$ | Formula (C1) |
| Polycarbonate chain: | $-(L^B\text{-}OCOO)n-$ | Formula (C2) |
| Polyester chain: | $-(L^C\text{-}COO)n-$ | Formula (C3) |
| | $-(OOC\text{-}L^{C1}\text{-}COO\text{-}L^{c2})n-$ | Formula (C4) |
| Polysiloxane chain: | $-(SiL^D{}_2\text{-}O)n-$ | Formula (C5) |

$L^A$ represents an alkylene group (preferably having 1 to 12 carbon atoms, more preferably having 2 to 6 carbon atoms, and particularly preferably having 2 to 4 carbon atoms).

$L^B$ represents an alkylene group (preferably having 1 to 12 carbon atoms, more preferably having 2 to 10 carbon atoms, and particularly preferably having 3 to 6 carbon atoms), an arylene group (preferably having 6 to 22 carbon atoms, more preferably having 6 to 14 carbon atoms, and particularly preferably having 6 to 10 carbon atoms), or a combination thereof.

$L^C$, $L^{C1}$, and $L^{C2}$ represent an alkylene group (preferably having 1 to 12 carbon atoms, more preferably having 2 to 10 carbon atoms, and particularly preferably having 2 to 8 carbon atoms), an arylene group (preferably having 6 to 22 carbon atoms, more preferably having 6 to 14 carbon atoms, and particularly preferably having 6 to 10 carbon atoms), or a combination thereof. $L^{C1}$ and $L^{C2}$ are not the same.

$L^D$ represents a hydrogen atom, a hydroxyl group, an alkyl group (preferably having 1 to 12 carbon atoms, more preferably having 1 to 6 carbon atoms, and particularly preferably having 1 to 3 carbon atoms), and an aryl group (preferably having 6 to 22 carbon atoms, more preferably having 6 to 14 carbon atoms, and particularly preferably having 6 to 10 carbon atoms).

n represents an integer of 3 or greater, preferably an integer of 6 or greater, and more preferably an integer of 10 or greater. The upper limit is 2500 or less, preferably 200 or less, and more preferably 50 or less. In the linking group represented by n, plural $L^A$, $L^B$, $L^C$, $L^{C1}$, $L^{C2}$, and $L^D$ may be identical to or difficult from each other.

An alkyl group, an aryl group, an alkylene group, and an arylene group may further have an arbitrary substituent (for example, a substituent T). Unless described otherwise in detail, all compounds or substituents are the same throughout the specification.

The weight average molecular weight of the polymer chain is preferably 200 or greater, more preferably 600 or greater, and particularly preferably 800 or greater. The upper limit of the weight average molecular weight is preferably 200,000 or less, more preferably 10,000 or less, and particularly preferably 5,000 or less.

The molecular weight of the polymer chain can be obtained as the weight average molecular weight in terms of polystyrene in the GPC with respect to the monomer before being combined with the polymer.

The specific polymer preferably includes a repeating unit of Formula (1) or (2) below and more preferably includes both of them.

(1)

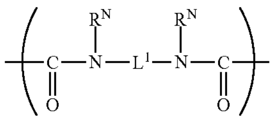

(2)

$-(X-L^2-X)-$ $L^1$ represents an alkylene group having 1 to 20 carbon atoms (preferably having 1 to 12 carbon atoms and more preferably having 1 to 6 carbon atoms), an arylene group having 6 to 22 carbon atoms (preferably having 6 to 14 carbon atoms and more preferably having 6 to 10 carbon atoms), or the combination thereof.

$L^2$ represents an alkylene group that may have a linking group having a heteroatom interposed therebetween (preferably having 1 to 12 carbon atoms, more preferably having 1 to 6 carbon atoms, and particularly preferably having 1 to 4 carbon atoms), an arylene group that may have a linking group having a heteroatom interposed therebetween (preferably having 6 to 22 carbon atoms, more preferably having 6 to 14 carbon atoms, and particularly preferably having 6 to 10 carbon atoms), or a combination thereof. Examples of the linking group having a heteroatom include a linking group X described below or a carbonyl group. $R^N$ represents a hydrogen atom, an alkyl group (preferably having 1 to 12 carbon atoms, more preferably having 1 to 6 carbon atoms, and particularly preferably having 1 to 3 carbon atoms), or an aryl group (preferably having 6 to 22 carbon atoms, more preferably having 6 to 14 carbon atoms, and particularly preferably having 6 to 10 carbon atoms).

X represents O, S, $NR^N$, and a combination thereof.

The specific polymer preferably contains a hard segment and a soft segment in a predetermined ratio. The hard segment is described as a segment that has a rigid group such as an aromatic group, a heteroaromatic group, and an aliphatic and alicyclic group in a main skeleton, has a bond portion that enables intermolecular packing caused by an intermolecular hydrogen bond or π-π interaction, generally comprises rigidity, has strong cohesive force, and has fiber morphology. The glass transition temperature of the compound consisting of the portions is high, and typically represents 100° C. or greater. A soft segment is described as a segment that has a straight long chain group or a branched long chain group at a main chain and that is flexible and elastic. The glass transition temperature thereof is low and represents 50° C. or less.

Hard Segment

It is preferable that the hard segment has a hydrogen bond interposed therebetween and has a skeleton for forming intermolecular pseudo-crosslinkage. The hard segment preferably contains at least one bond of an amide bond, a urea bond, a urethane bond, or an imide bond. The hard segment is more preferably selected from Group 1 below.

<Group I>

(I-1)

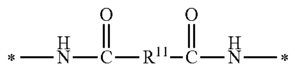

(I-2)

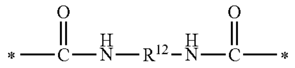

(I-3)

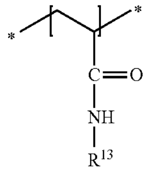

-continued (I-4)

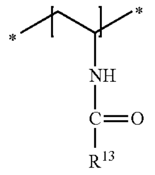

(I-5)

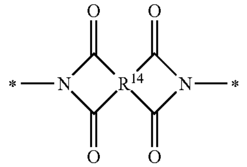

* represents a bonding position.

Each of $R^{11}$ and $R^{12}$ independently represents an alkylene group (preferably having 1 to 12 carbon atoms, more preferably having 1 to 6 carbon atoms, and particularly preferably having 1 to 3 carbon atoms), an arylene group (preferably having 6 to 22 carbon atoms, more preferably having 6 to 14 carbon atoms, and particularly preferably having 6 to 10 carbon atoms), or a combination thereof. Preferable examples of the linking group of $R^{11}$ and $R^{12}$ include a group expressed by Formula (M2) below. Formulae (I-1) and (I-2) are linked to an oxygen atom or an imino group ($NR^N$) at the bonding position * to become a urethane group or a urea group. A hydrogen atom of the NH group in each formula may be substituted with an arbitrary substituent T. Examples of the substituent that is substituted with N include examples of the $R^N$. This is the same throughout this specification.

$R^{13}$ represents an alkyl group (preferably having 1 to 12 carbon atoms, more preferably having 1 to 6 carbon atoms, and particularly preferably having 1 to 3 carbon atoms), an alkenyl group (preferably having 2 to 12 carbon atoms, more preferably having 2 to 6 carbon atoms, and particularly preferably having 2 to 3 carbon atoms), an aryl group (preferably having 6 to 22 carbon atoms, more preferably having 6 to 14 carbon atoms, and particularly preferably having 6 to 10 carbon atoms), and an aralkyl group (preferably having 7 to 23 carbon atoms, more preferably having 7 to 15 carbon atoms, and particularly preferably having 7 to 11 carbon atoms). In Formula (I-3), an ethylene group of a main chain is substituted with an arbitrary substituent (a methyl group, an ethyl group, a propyl group, a halogen atom, a hydroxy group, and the like).

Here, $R^{13}$ may form a ring. For example, in Formula (I-4), $R^{13}$ may be bonded to N, and form a pyrrolidone ring substituted at an N position.

In Formulae (I-3) and (I-4), an ethylene group of the main chain may have the substituent T. Examples of the substituent include a methyl group, an ethyl group, a halogen atom, and a cyano group. An arbitrary linking group may be interposed between an ethylene group of the main chain and a CO group or an NH group of the substituent.

$R^{14}$ represents an aromatic or aliphatic tetravalent linking group. $R^{14}$ is preferably a linking group expressed by any one of Formulae (i) to (iix) below.

(i)

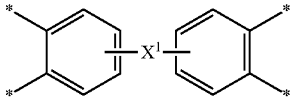

-continued (ii)

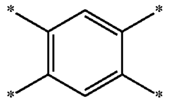

(iii)

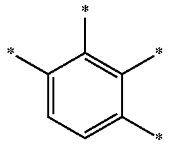

(iv)

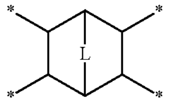

(v)

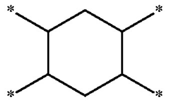

(vi)

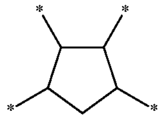

(vii)

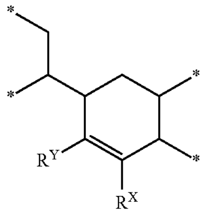

(iix)

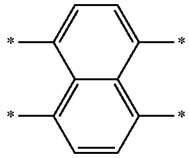

In the formula, $X^1$ represents a single bond or a divalent linking group. As the divalent linking group, an alkylene group having 1 to 6 carbon atoms (methylene group, ethylene group, propylene group), $-SO_2-$, $-S-$, $-CO-$, and $-O-$ are preferable. Among these, the alkylene group is more preferable. L represents an alkenylene group (for example, $-CH{=}CH-$) or an alkylene group (for example, $-CH_2-$ and $-CH_2CH_2-$). $R^X$ and $R^Y$ represent a hydrogen atom or a substituent (for example, the substituent T). * represents a bonding position with a carbonyl group.

Soft Segment

Meanwhile, the soft segment preferably contains at least one of a polyalkylene oxide chain (a polyethylene oxide chain or a polypropylene oxide chain is preferable), a polycarbonate chain, or a polyester chain. The soft segment is more preferably selected from Group II below.

<Group II>

(II-1)

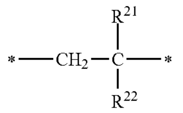

(II-2)

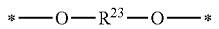

(II-3)

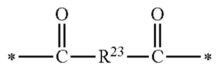

(II-4)

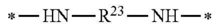

(II-5)

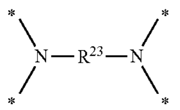

* represents a bonding position.

$R^{21}$ represents a hydrogen atom or an alkyl group (preferably having 1 to 12 carbon atoms, more preferably having 1 to 6 carbon atoms, and particularly preferably having 1 to 3 carbon atoms).

$R^{22}$ represents a substituent containing a polyalkylene oxide chain (preferably a polyethylene oxide chain and a polypropylene oxide chain), a polycarbonate chain, a polyester chain, or a polysiloxane (silicone) chain and having a weight average molecular weight of 200 to 200,000. $R^{22}$ preferably has an alkyl group (preferably having 1 to 12 carbon atoms and more preferably having 1 to 6 carbon atoms) at a terminal. Among these, this alkyl group may have an ether group (O), a thioether group (S), a carbonyl group (CO), and an imino group ($NR^N$). $R^{22}$ may have a heteroatom-containing group or a carbon-carbon unsaturated group defined as a third component below. The molecular weight is preferably 500 or greater, more preferably 700 or greater, and particularly preferably 1,000 or greater. The upper limit is preferably 100,000 or less and more preferably 10,000 or less.

$R^{23}$ is preferably a linking group relating to any one of Formulae (C1) to (C4) or the combination thereof. Among these, a linking group containing a polyalkylene oxide chain (preferably a polyethylene oxide chain and a polypropylene oxide chain), a polycarbonate chain, a polyester chain, or a polysiloxane (silicone) chain and having a weight average molecular weight of 200 to 200,000 is preferable. The molecular weight is preferably 500 or greater, more preferably 700 or greater, and particularly preferably 1,000 or greater. The upper limit is preferably 100,000 or less and more preferably 10,000 or less.

The molecular weights of $R^{22}$ and $R^{23}$ can be obtained by the weight average molecular weight in terms of polystyrene in the GPC with respect to a monomer before the combination with the polymer.

As the ratio between the hard segment component and the soft segment component of the specific polymer, the hard segment component is preferably 50 mol % or greater, more preferably 60 mol % or greater, and particularly preferably 70 mol % or greater with respect to the total polymer. The upper limit is preferably 99 mol % or less, more preferably 90 mol % or less, and particularly preferably 80 mol % or less.

The soft segment component is preferably 1 mol % or greater, more preferably 2 mol % or greater, and particularly preferably 5 mol % or greater with respect to the total polymer. The upper limit is preferably 50 mol % or less, more preferably 30 mol % or less, and particularly preferably 20 mol % or less.

The soft segment component is preferably 1 part by mass or greater, more preferably 10 parts by mass or greater, and particularly preferably 100 parts by mass or greater with respect to 100 parts by mass of the hard segment component, by the molar ratio. The upper limit is preferably 10,000 parts by mass or less, more preferably 5,000 parts by mass or less, and particularly preferably 1,000 parts by mass or less.

If the respect segments are adjusted in the ranges described above, it is possible to obtain more excellent effects in reduction properties and maintenance properties of the interface resistance in the all-solid-state secondary battery. Therefore, the adjustment is preferable.

Third Component

The specific polymer preferably further has a repeating unit with a heteroatom-containing group. As the heteroatom-containing group, at least one of an alcoholic hydroxyl group-containing group (for example, a hydroxyalkyl group: preferably having 1 to 6 carbon atoms and more preferably having 1 to 3 carbon atoms), a phenolic hydroxyl group-containing group (for example, a hydroxyphenyl group), a thiol group, a carboxyl group, a sulfonic acid group, a sulfonamide group, a phosphoric acid group, a nitrile group, amino group, a zwitterion-containing group, a metal hydroxide group, or a metal alkoxide group is preferable. Here, the amino group is preferably expressed by $NR^N_2$. Specifically, the zwitterion-containing group is a betaine structure (preferably having 1 to 12 carbon atoms and more preferably having 1 to 6 carbon atoms), examples of the cation portion includes quaternary ammonium, sulfonium, and phosphonium, and examples of the anion portion include carboxylate and sulfonate. Specifically, metal hydroxide is a hydroxylsilyl group and a hydroxyltitanyl group. Specifically, metal alkoxide is an alkoxysilyl group (preferably having 1 to 12 carbon atoms and more preferably having 1 to 6 carbon atoms), an alkoxytitanyl group (preferably having 1 to 12 carbon atoms and more preferably having 1 to 6 carbon atoms), and more specifically a trimethoxysilyl group, a methyldimethoxysilyl group, a triethoxysilyl group, a methyldiethoxysilyl group, and a trimethoxytitanyl group.

In the specific polymer, the repeating unit with a heteroatom-containing group is preferably 0 mol % to 30 mol % with respect to the total polymer. If the repeating unit with the heteroatom-containing group is combined with the specific polymer, effects of increasing of the conductivity of the lithium ion, occurring interactions with the inorganic solid electrolyte, and increasing the adhesiveness are expected. Therefore, the combination is preferable.

The specific polymer may have a potentially crosslinkable group that can be crosslinked by heat or light. The crosslinkable group may provide a radical polymerizable group, a cation polymerizable group, and the like. Examples of the radical polymerizable group include a carbon-carbon unsaturated group, and specific examples thereof include an acryl group, a methacryl group, a vinyl group, an allyl group, a maleimide group, a terminal ethynyl group, an internal ethynyl group, and a propargyl group. Examples of the cation polymerizable group include a hetero ring, and specific examples thereof include an epoxy group, an oxetanyl group, and an aziridine group.

The crosslinkable group is more preferably expressed by Formula (11), (12), or (13) below.

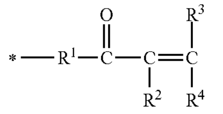

(11)

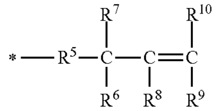

(12)

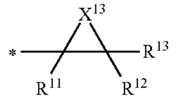

(13)

* represents a bonding position.

Each of $R^1$ and $R^5$ independently represents an oxygen atom or an imino group ($NR^N$). $R^N$ has the same meaning as the above. Each of $R^2$ to $R^4$ and $R^6$ to $R^{10}$ independently represents a hydrogen atom or an alkyl group (preferably having 1 to 12 carbon atoms, more preferably having 1 to 6 carbon atoms, and particularly preferably having 1 to 3 carbon atoms). Each of $R^{11}$ to $R^{13}$ independently represents a hydrogen atom or an alkyl group (preferably having 1 to 12 carbon atoms, more preferably having 1 to 6 carbon atoms, and particularly preferably having 1 to 3 carbon atoms). $X^{13}$ represents an oxygen atom, a sulfur atom, and an imino group ($NR^N$). $R^N$ has the same meaning as above. The repeating unit with the crosslinkable group is preferably 0 mol % to 30 mol % with respect to the total polymer. If the repeating unit with the crosslinkable group is combined with the specific polymer, the chemical bond with the inorganic solid electrolyte occurs, and the increase of the adhesiveness is expected. Therefore, the combination is preferable.

The third component exists in any one of the hard segment portion and the soft segment portion in the chain of the specific polymer. The third component may exist at the side chain of the polymer or may exist at the terminal of the main chain of the polymer.

Hereinafter, specific examples of the specific polymer are described. Particularly, the polymer having the hard segment and the soft segment is mainly described, but the invention is not interpreted to be limited thereto.

Polymer Having Amide Bond

Examples of the polymer having an amide bond include polyamide and polyacrylamide. Polyamide can be obtained by condensing and polymerizing diamine and dicarboxylic acid or by ring opening polymerization of lactam. Meanwhile, polyacrylamide can be obtained by radically polymerizing an acrylamide monomer. If polyacrylamide copolymerizes with the acrylamide monomer, the polyacrylamide can copolymerize with an arbitrary radical monomer. Examples of the copolymerization method include random polymerization, graft polymerization, and block polymerization, but block polymerization is more preferable in order to construct polyacrylamide as the hard segment. The introduction of the soft segment of the amide polymer can be performed by condensing and polymerizing a long chain alkyl group that may be divided by a heteroatom, for example, a dicarboxylic acid and terminal diamine having an ethylene oxide chain and a propylene oxide chain. The soft segment-containing diamine can use, for example, "JEFFAMINE" series (manufactured by Huntsman Corporation and Mitsui Fine Chemicals, Inc.) as commercially available products.

Polymer Having Urea Bond

Examples of the polymer having a urea bond include polyurea. Polyurea can be synthesized by condensing and polymerizing a diisocyanate compound and a diamine compound in the presence of an amine catalyst. Examples of the diisocyanate are not particularly limited, and suitably selected. Examples thereof include a compound expressed by Formula (M1) below.

$$OCN—R^{M1}—NCO \qquad (M1)$$

$R^{M1}$ represents divalent aliphatic or aromatic hydrocarbon that may have a substituent (for example, preferably any one of an alkyl group, an aralkyl group, an aryl group, an alkoxy group, and a halogeno group). If necessary, $R^{M1}$ above may have another functional group that does not react with an isocyanate group, for example, any one of an ester group, a urethane group, an amide group, and a ureide group.

The diisocyanate compound expressed by Formula (M1) above is not particularly limited, and suitably selected according to the purpose. However, it is preferable to include a group expressed by Formula (M2) below.

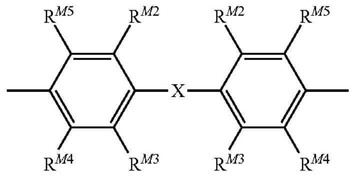

(M2)

In the formula, X represents a single bond, $—CH_2—$, $—C(CH_3)_2—$, $—SO_2—$, —S—, —CO—, or —O—. In view of the binding properties, $—CH_2—$ and —O— are preferable, and $—CH_2—$ is more preferable. Here, the alkylene group exemplified herein may be substituted with a halogen atom (preferably a fluorine atom).

$R^{M2}$ to $R^{M5}$ may be identical to or different from each other, and respectively represents a hydrogen atom, a monovalent organic group, a halogen atom, $—OR^{M6}$, $—N(R^{M6})_2$, or $—SR^{M6}$. Each of $R^{M6}$ independently represents a hydrogen atom, or a monovalent organic group. Examples of the monovalent organic group include an alkyl group having 1 to 20 carbon atoms, an alkenyl group having 1 to 20 carbon atoms, $—OR^{M7}$ (here, $R^{M7}$ represents a monovalent organic group (preferably an alkyl group having 1 to 20 carbon atoms and an aryl group having 6 to 10 carbon atoms)), an alkylamino group (preferably having 1 to 20 carbon atoms and more preferably having 1 to 6 carbon atoms), and an arylamino group (preferably having 6 to 40 carbon atoms and more preferably having 6 to 20 carbon atoms). As $R^{M2}$ to $R^{M5}$ above, a hydrogen atom, an alkyl group having 1 to 20 carbon atoms, and $—OR^{M7}$ are preferable, a hydrogen atom and an alkyl group having 1 to 20 carbon atoms are more preferable, and a hydrogen atom is particularly preferable. Examples of the halogen atom include fluorine, chlorine, and bromine. Among these, it is preferable that $R^{M2}$ to $R^{M5}$ are hydrogen atoms.

The composition ratio of the aromatic group expressed by Formulae (M1) and (M2) above is preferably 10 mol % or greater, more preferably 10 mol % to 50 mol %, and even more preferably 30 mol % to 50 mol % in the polymer.

The soft segment of the polymer having the urea bond is introduced by condensing and polymerizing a long chain alkyl group that may be divided by a heteroatom, for example, isocyanate and terminal diamine having an ethylene oxide chain and a propylene oxide chain. The soft segment-containing diamine can use "JEFFAMINE" series (manufactured by Huntsman Corporation and Mitsui Fine Chemicals, Inc.) as commercially available products. Specific examples thereof include JEFFAMINE D-230, JEFFAMINE D-400, JEFFAMINE D-2000, JEFFAMINE XTJ-510, JEFFAMINE XTJ-500, JEFFAMINE XTJ-501, JEFFAMINE XTJ-502, JEFFAMINE HK-511, JEFFAMINE EDR-148, JEFFAMINE XTJ-512, JEFFAMINE XTJ-542, JEFFAMINE XTJ-533, and JEFFAMINE XTJ-536.

Polymer Having Imide Bond

Polyimide is included as the polymer having an imide bond. Polyimide can be obtained by adding tetracarboxylic dianhydride and diamine, forming a polyamic acid, and performing ring-closing. Since it is preferable that diamine is used as the soft segment, a structure having amino groups on both terminals of a polyethylene oxide chain, a polypropylene oxide chain, a polycarbonate chain, and a polyester chain is preferable. The soft segment-containing diamine can use "JEFFAMINE" series (manufactured by Huntsman Corporation and Mitsui Fine Chemicals, Inc.) as commercially available products. Specific examples thereof include JEFFAMINE D-230, JEFFAMINE D-400, JEFFAMINE D-2000, JEFFAMINE XTJ-510, JEFFAMINE XTJ-500, JEFFAMINE XTJ-501, JEFFAMINE XTJ-502, JEFFAMINE HK-511, JEFFAMINE EDR-148, JEFFAMINE XTJ-512, JEFFAMINE XTJ-542, JEFFAMINE XTJ-533, and JEFFAMINE XTJ-536.

Polymer Having Urethane Bond

Examples of the polymer having the urethane bond include polyurethane. The polymer having the urethane bond can be obtained by condensing and polymerizing an isocyanate compound and a diol compound in the presence of titanium, tin, and bismuth catalysts. The isocyanate compound can use compounds exemplified above. Diol having a polyethylene oxide chain, a polypropylene oxide chain, a polycarbonate chain, and a polyester chain is preferable. In addition, diol preferably has a carbon-carbon unsaturated group or a polar group (an alcoholic hydroxyl group, a phenolic hydroxyl group, a thiol group, a carboxyl group, a sulfonic acid group, a sulfonamide group, a phosphoric acid group, a nitrile group, amino group, a zwitterion-containing group, metal hydroxide, and metal alkoxide). For example, 2,2-bis(hydroxymethyl)propionic acid can be used. The diol compound containing the carbon-carbon unsaturated group can appropriately use compounds disclosed in JP2007-187836A, in addition to BLEMMER GLM (manufactured by NOF Corporation) as the commercially available product.

In the case of polyurethane, monoalcohol or monoamine can be used as a polymerization terminator. The polymerization terminator is introduced to a terminal portion of the main chain of polyurethane. As means for introducing a soft segment to a polyurethane terminal, polyalkylene glycol monoalkyl ether (preferably polyethylene glycol monoalkyl ether, and polypropylenemonoalkyl ether), polycarbonatediol monoalkyl ether, polyesterdiol monoalkyl ether, polyester monoalcohol, and the like can be used.

A polar group or a carbon-carbon unsaturated group can be introduced to a terminal of a main chain of the polyurethane by using monoamine or monoalcohol having a polar group or a carbon-carbon unsaturated group. Examples thereof include hydroxyacetic acid, hydroxypropionic acid, 4-hydroxybenzyl alcohol, 3-mercapto-1-propanol, 2,3-dimercapto-1-propanol, 3-mercapto-1-hexanol, 3-hydroxypropanesulfonic acid, 2-cyanoethanol, 3-hydroxyglutaronitrile, 2-aminoethanol, 2-hydroxyethylmethacrylate, 2-hydroxyethylacrylate, and N-methacrylene diamine.

In the case of polyurethane, it is preferable that the isocyanate compound portion functions as a hard segment and a diol compound portion functions as a soft segment.

Hereinafter, specific compound examples of the specific polymer for forming the nonspherical polymer particles are described. However, the invention is not limited to these compound examples.

(A-1)

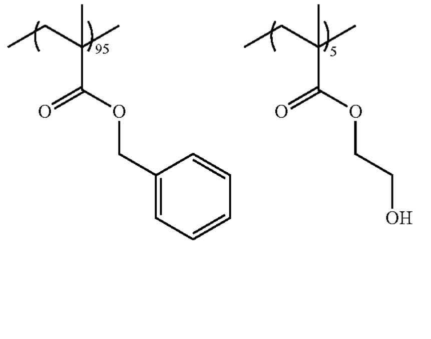

(A-2)

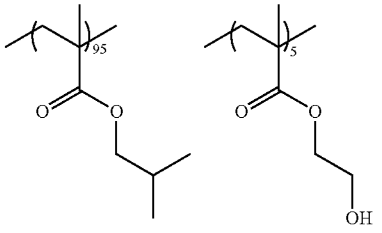

(A-3)

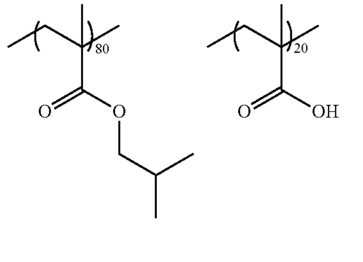

(A-4)

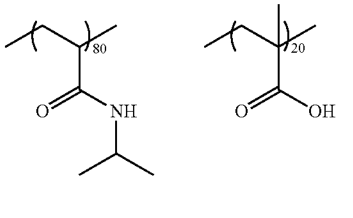

-continued
(A-5)
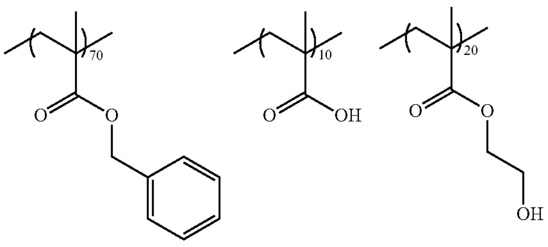
(A-6)
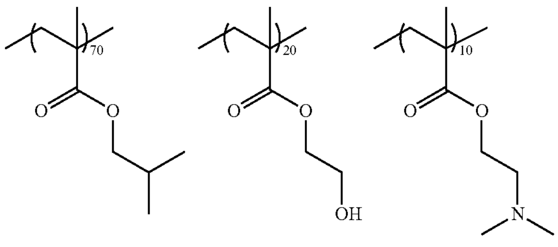
(A-7)
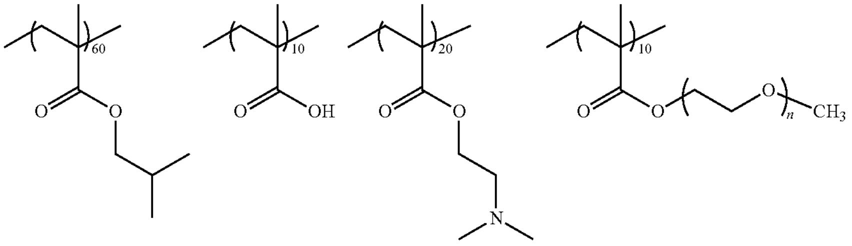
(A-8)
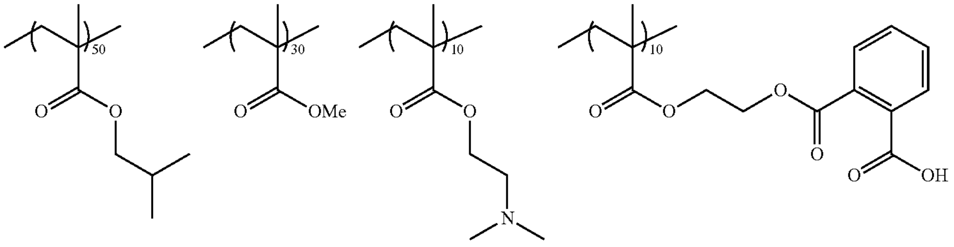
(A-9)
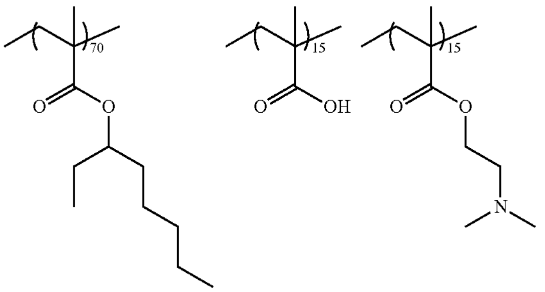
(A-10)
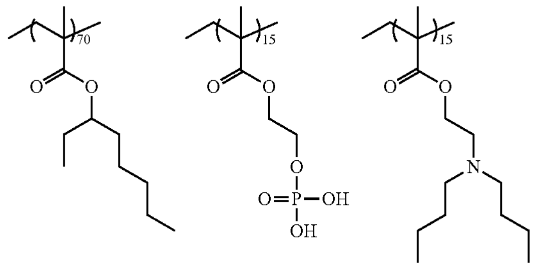
(A-11)
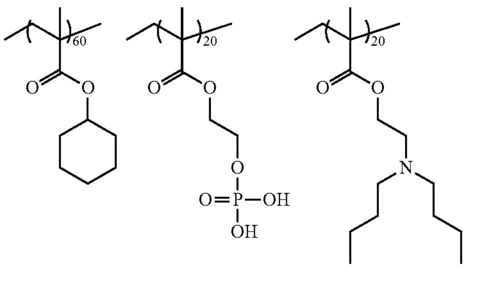
(A-12)
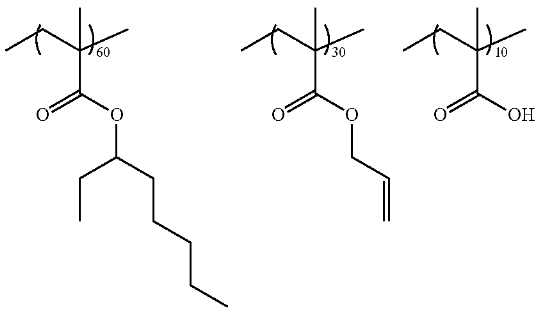

-continued
(A-13)
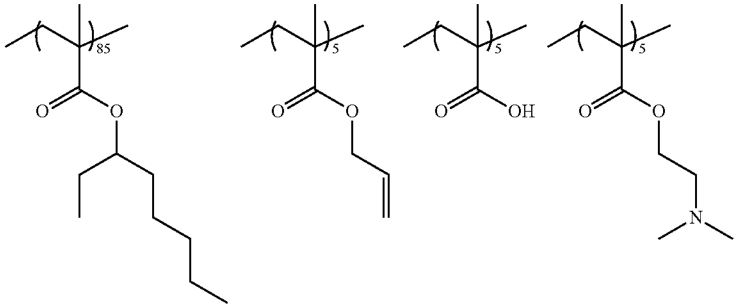
(A-14)
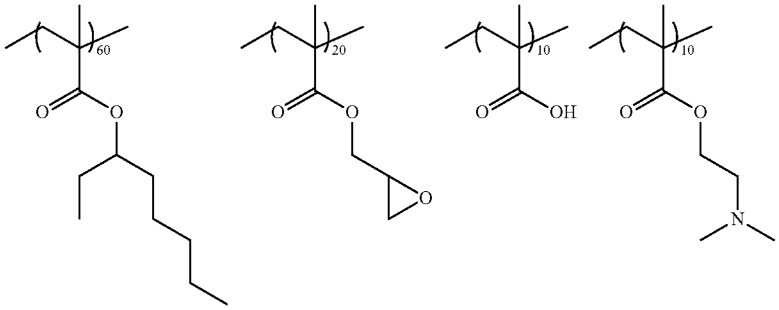
(A-15)
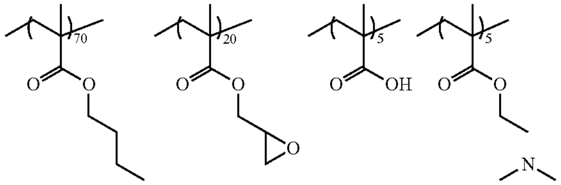
(A-16)
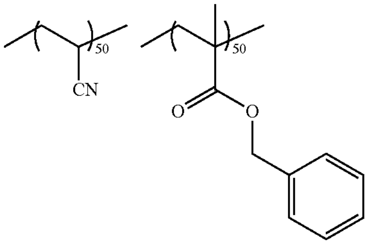
(A-17)
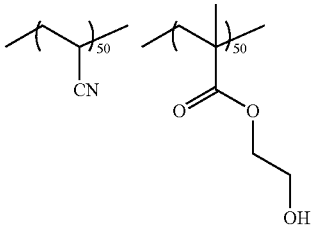
(A-18)
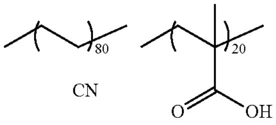
(A-19)
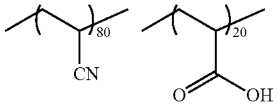
(A-20)
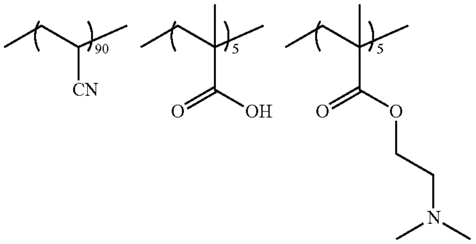
(A-21)
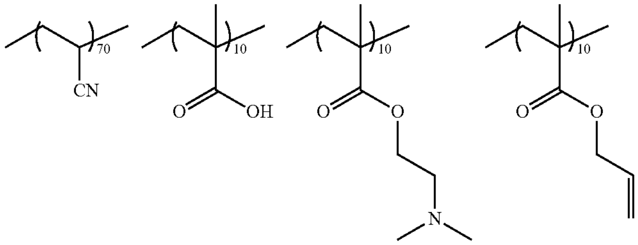

-continued
(A-22)
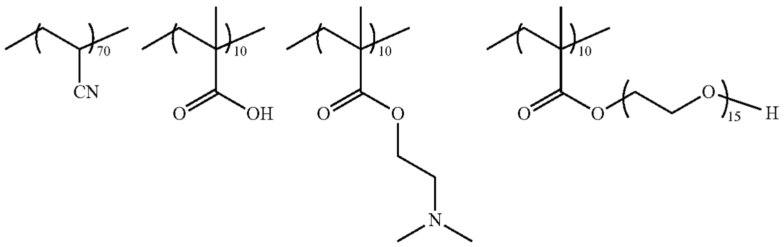
(A-23)
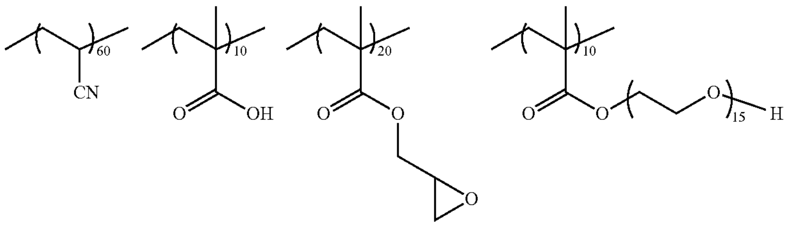
(A-24)
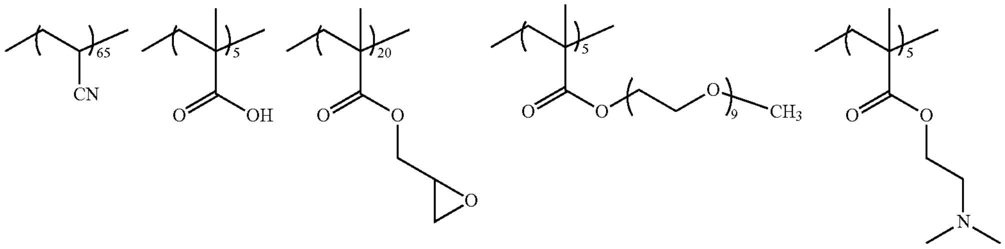
(A-25)
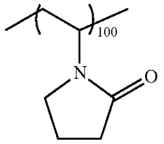
(A-26)
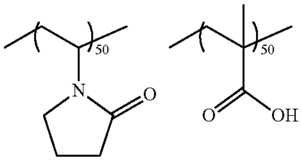
(A-27)
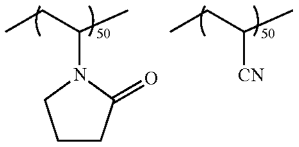
(A-28)
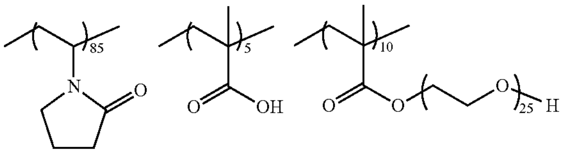
(A-29)
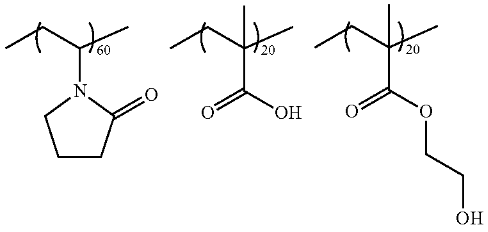
(A-30)
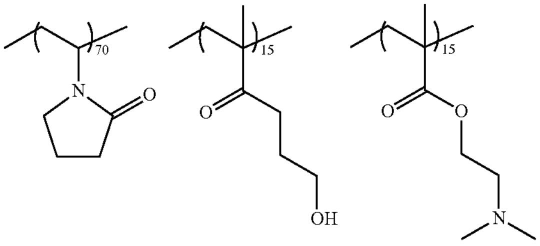

-continued
(A-31)
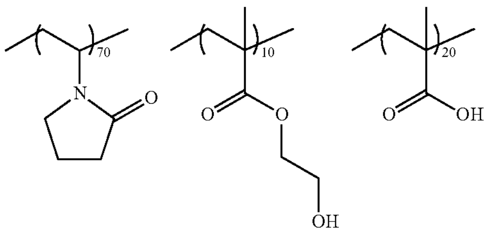
(A-32)
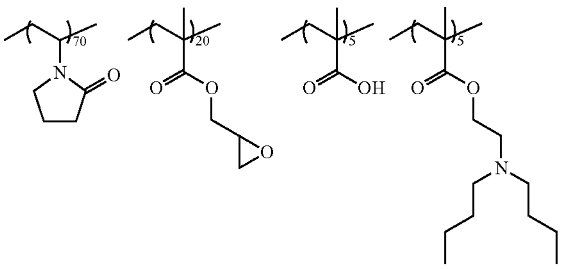
(A-33)
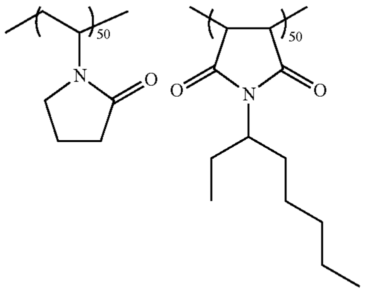
(A-34)
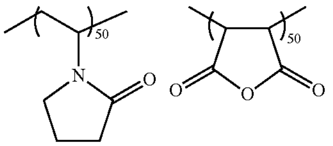
(A-35)
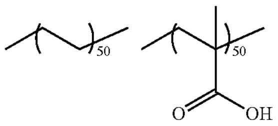
(A-36)
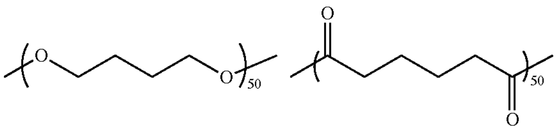
(A-37)
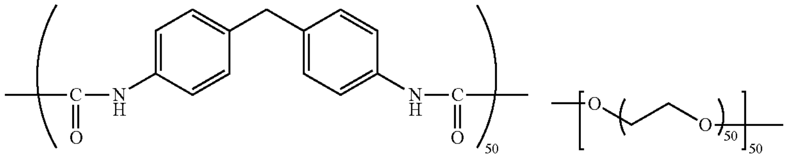
(A-38)
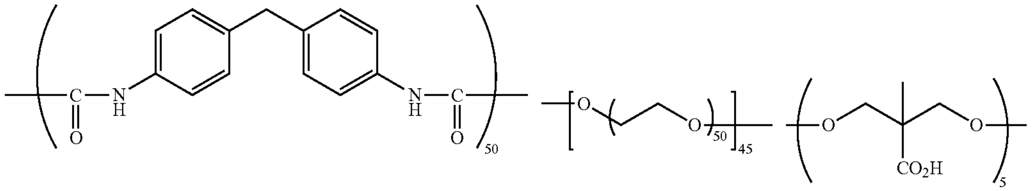
(A-39)
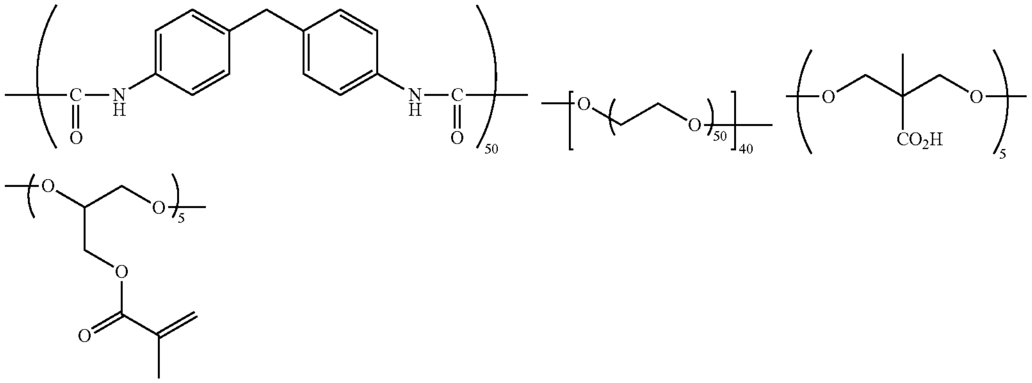

-continued
(A-40)
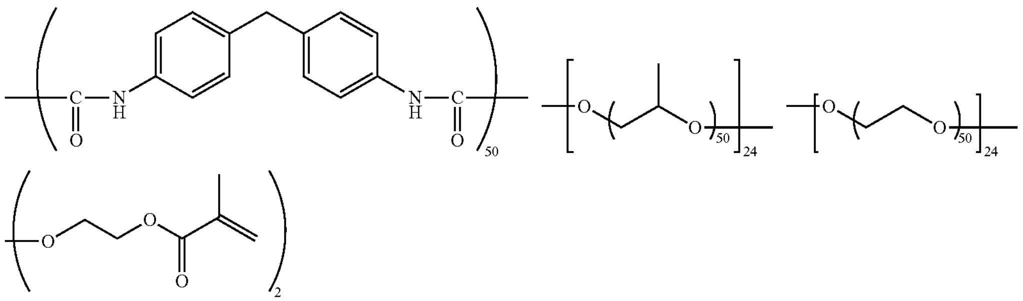
(A-41)
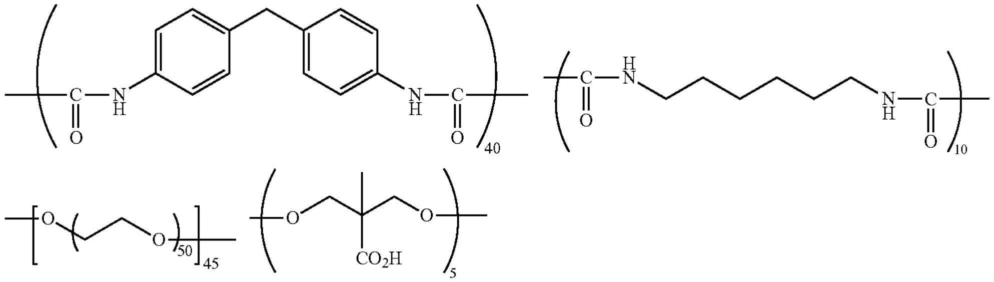
(A-42)
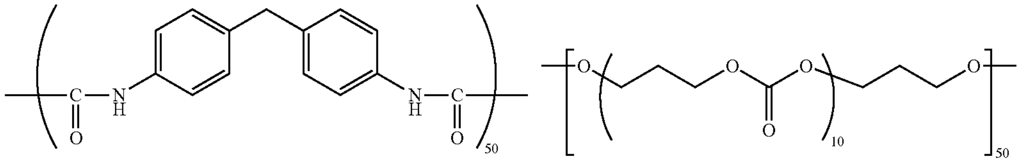
(A-43)
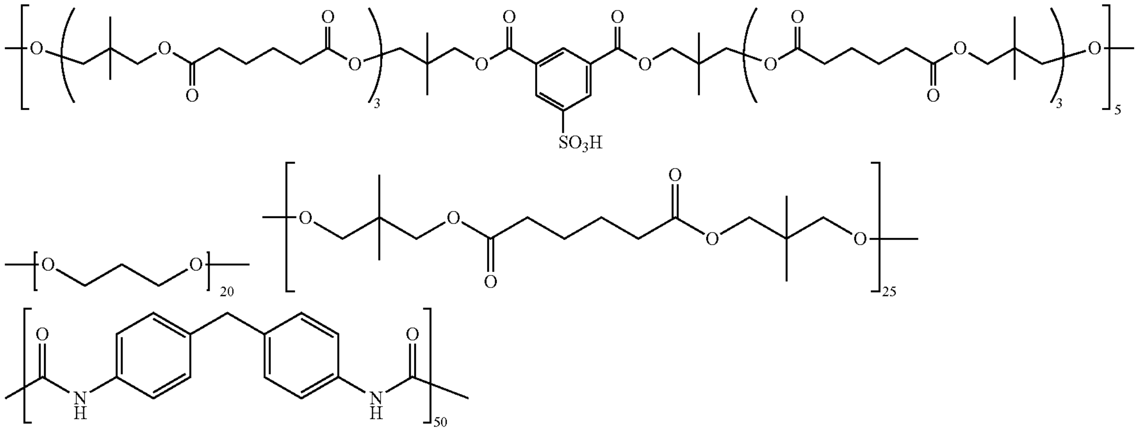
(A-44)
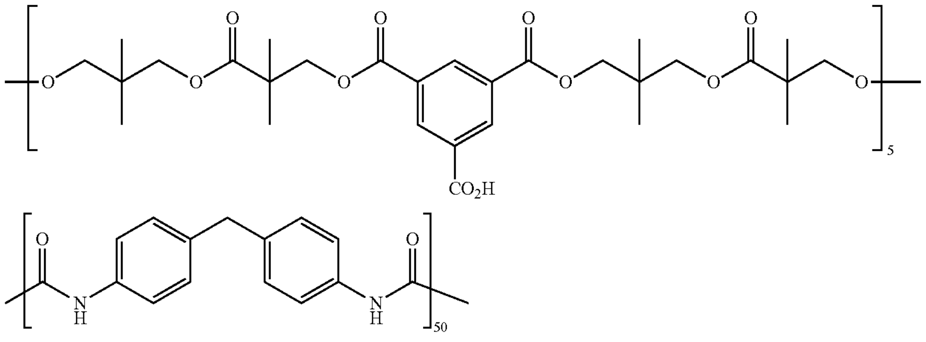

-continued
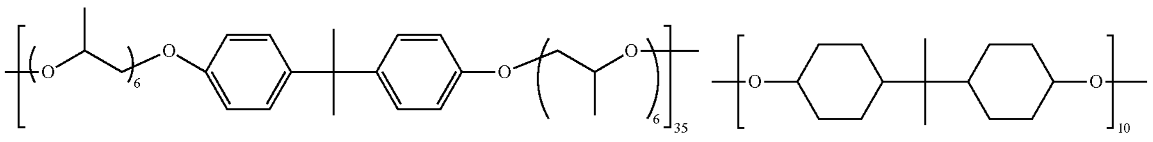
(A-45)
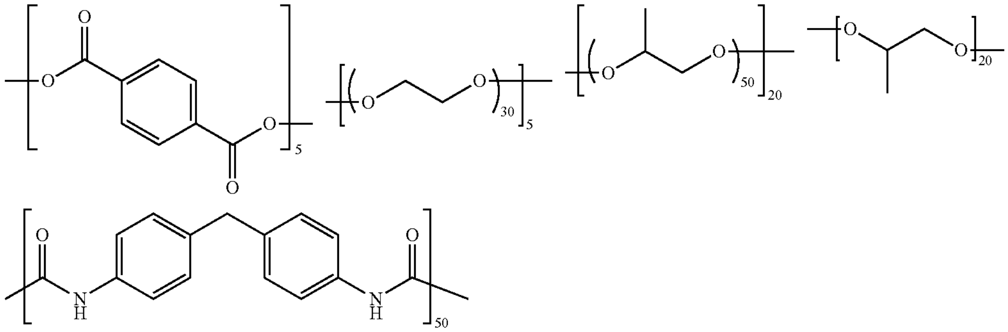
(A-46)
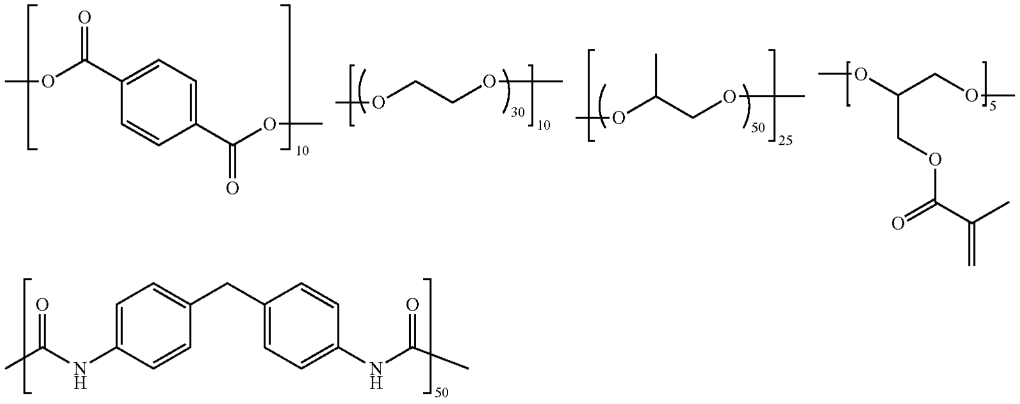
(A-47)
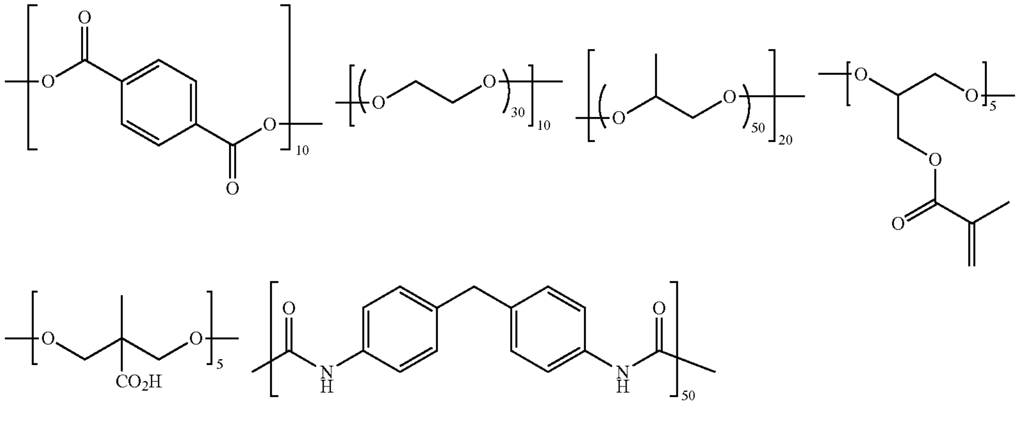
(A-48)
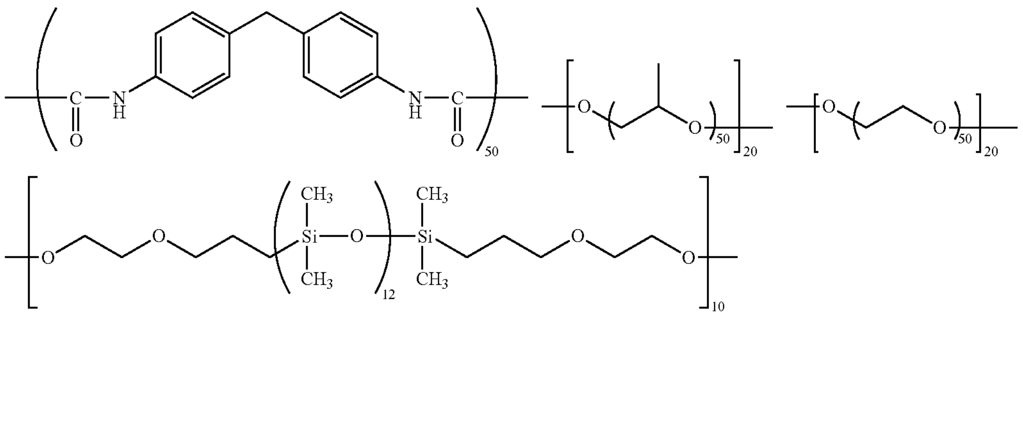

-continued
(A-49)
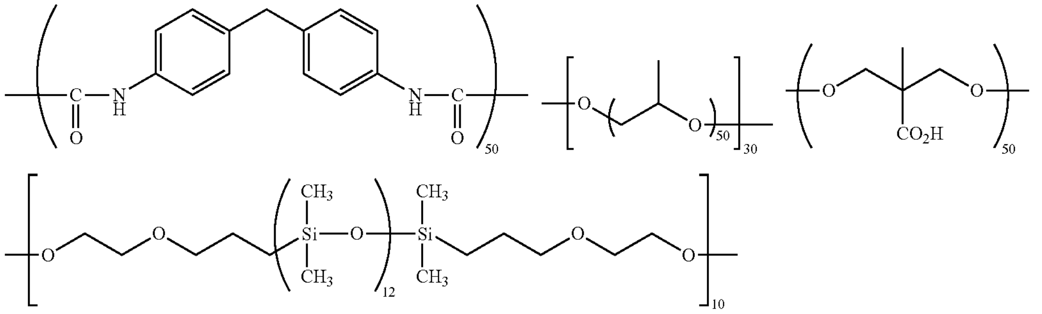
(A-50
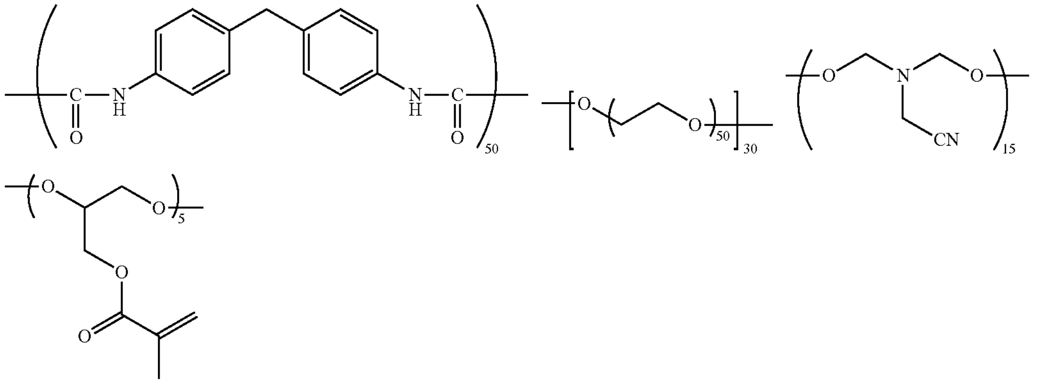
(A-51)
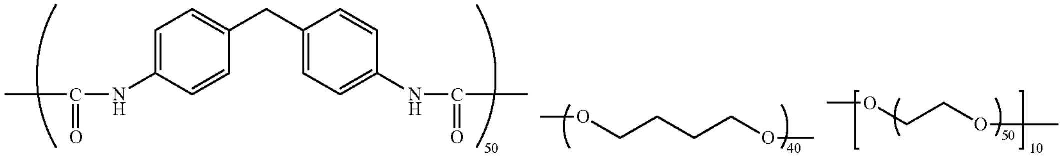
(A-52)
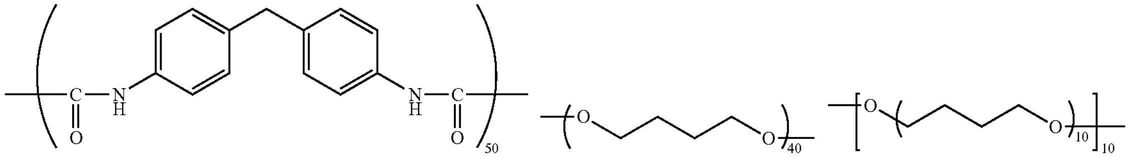
(A-53)
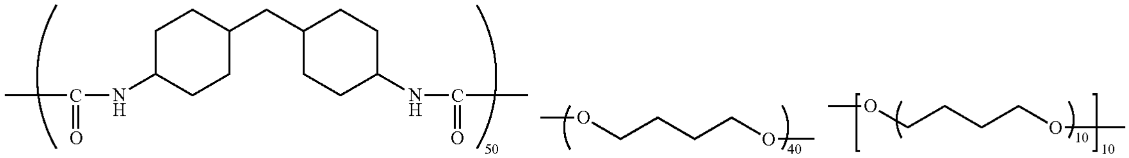
(A-54)
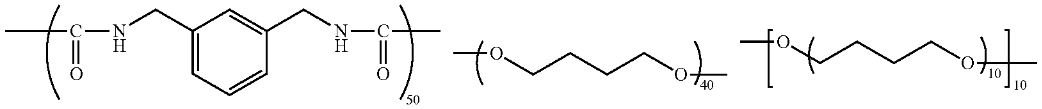
(A-55)
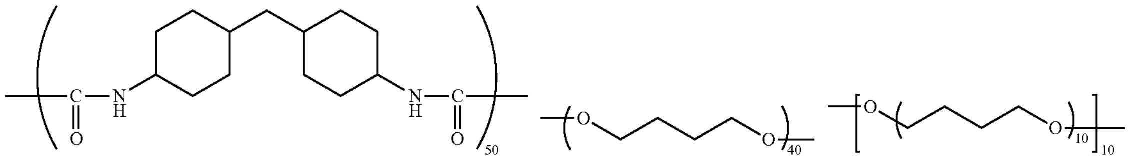

-continued
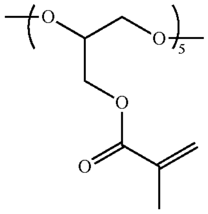
(A-56)
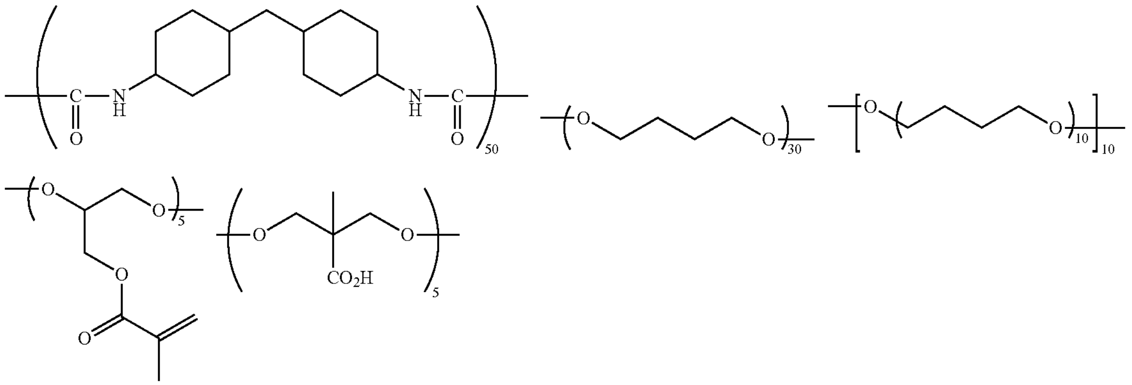
(A-57)
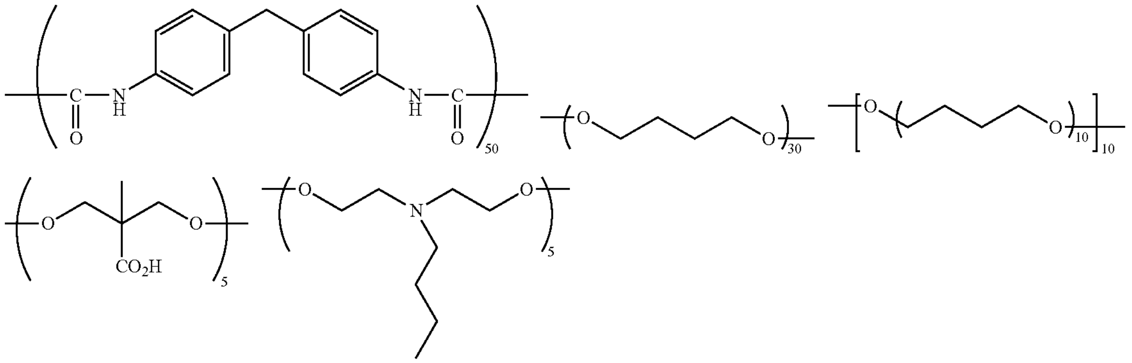
(A-58)
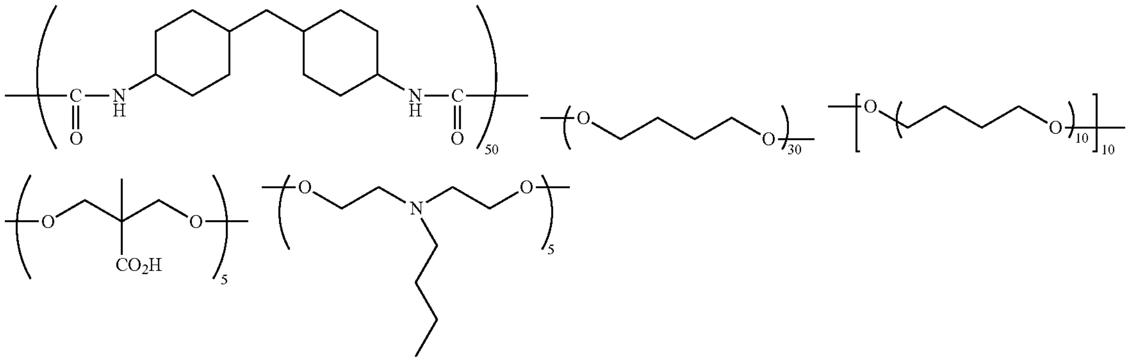
(A-59)
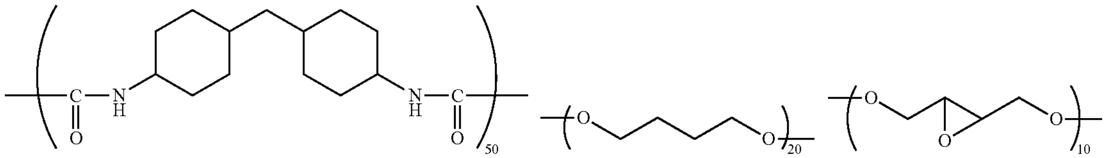

-continued
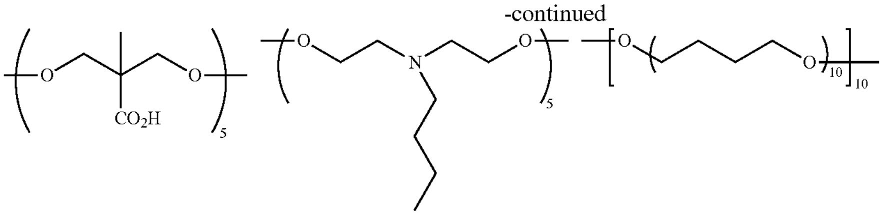
(A-60)
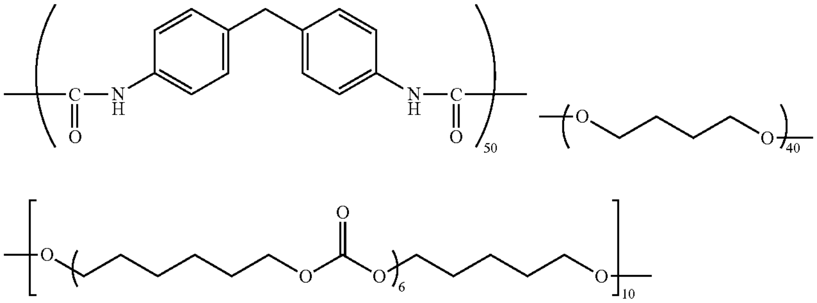
(A-61)
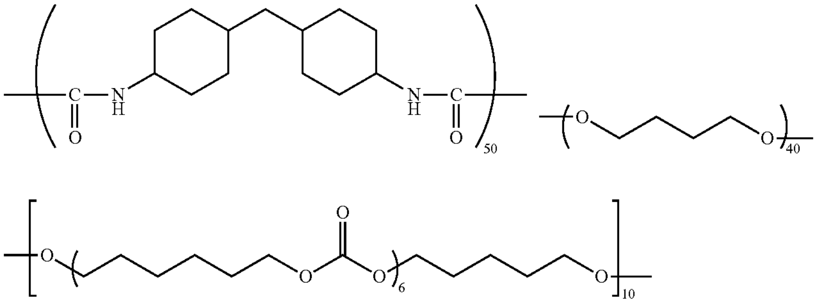
(A-62)
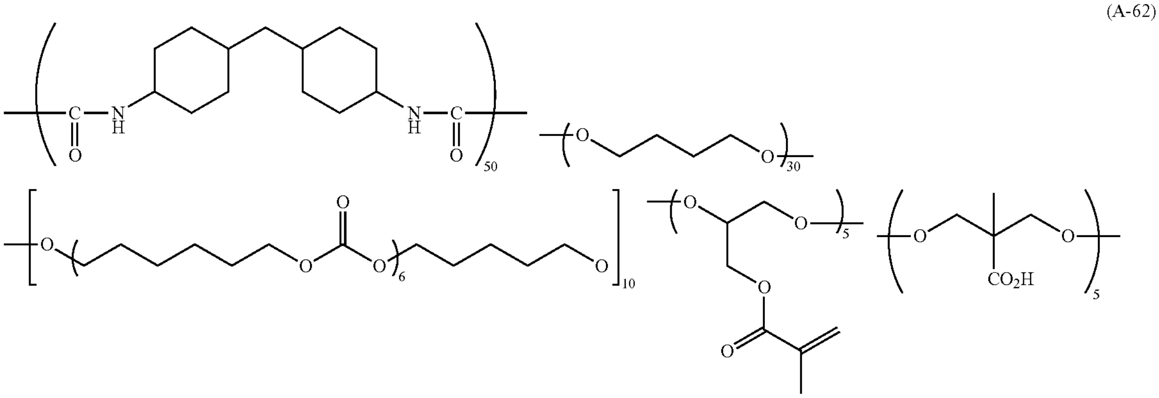
(A-63)
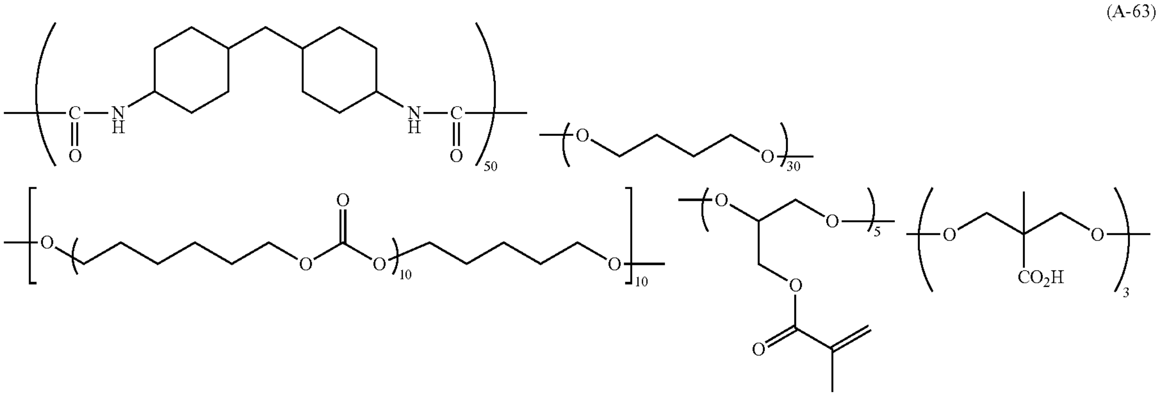

-continued

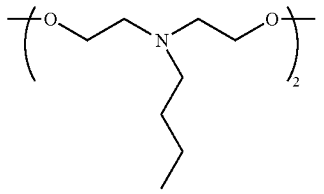

(A-64)

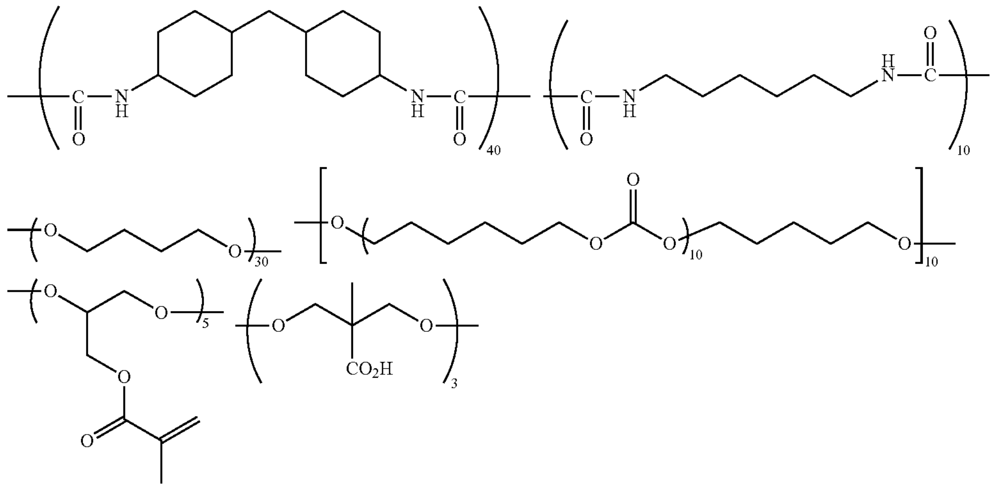

(A-65)

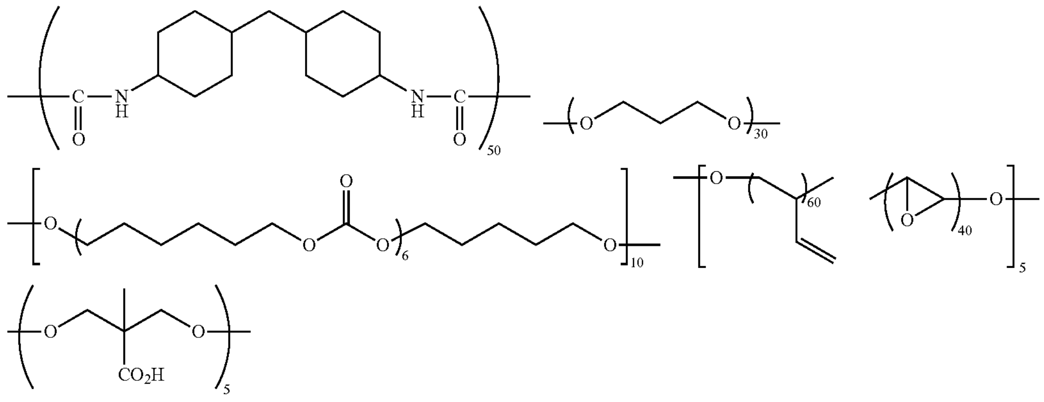

(A-66)

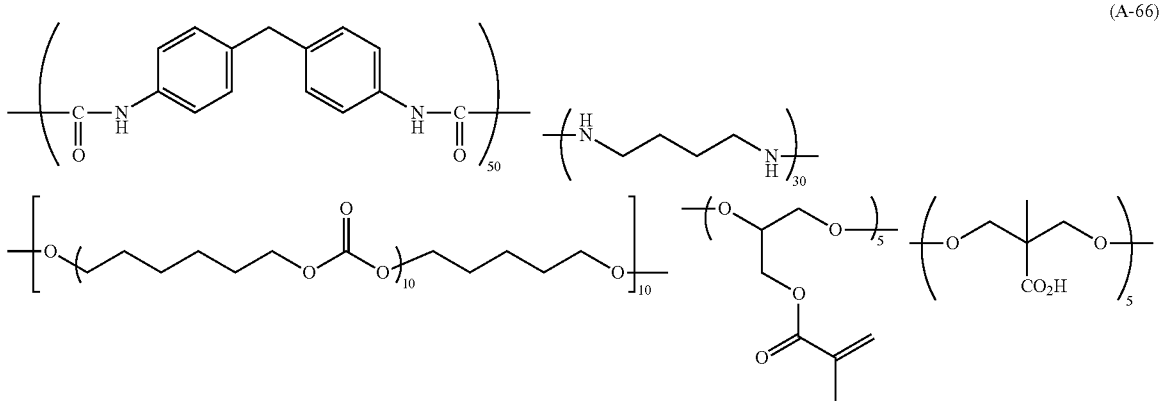

The exemplary compound may suitably have a substituent. Examples of the arbitrary substituent include the substituent T.

Examples of the substituent T include the followings.

Examples thereof include an alkyl group (preferably an alkyl group having 1 to 30 carbon atoms, for example, methyl, ethyl, isopropyl, t-butyl, pentyl, hexyl, 2-ethyl hexyl, heptyl, 1-ethylpentyl, decyl, dodecyl, hexadecane, octadecane, benzyl, 2-ethoxyethyl, and 1-carboxymethyl), an alkenyl group (preferably an alkenyl group having 2 to 20 carbon atoms, for example, vinyl, allyl, and oleyl), an alkynyl group (preferably an alkynyl group having 2 to 20 carbon atoms, for example, ethynyl, butadiynyl, and phenylethynyl), a cycloalkyl group (preferably a cycloalkyl group having 3 to 20 carbon atoms, for example, cyclopropyl, cyclopentyl, cyclohexyl, and 4-methylcyclohexyl), an aryl group (preferably an aryl group having 6 to 26 carbon atoms, for example, phenyl, 1-naphthyl, 4-methoxyphenyl, 2-chlorophenyl, and 3-methylphenyl), a hetero cyclic group (preferably a hetero cyclic group having 2 to 20 carbon atoms, more preferably a hetero cyclic group of 5 or 6-membered ring having 2 to 20 carbon atoms and having at least one of an oxygen atom, a sulfur atom, or a nitrogen atom is preferable, for example, 2-pyridyl, 4-pyridyl, 2-imidazolyl, 2-benzimidazolyl, 2-thiazolyl, and 2-oxazolyl), an alkoxy group (preferably an alkoxy group having 1 to 20 carbon atoms, for example, methoxy, ethoxy, isopropyloxy, and benzyloxy), an aryloxy group (preferably an aryloxy group having 6 to 26 carbon atoms, for example, phenoxy, 1-naphthyloxy, 3-methylphenoxy, and 4-methoxyphenoxy), an alkoxycarbonyl group (preferably an alkoxycarbonyl group having 2 to 20 carbon atoms, for example, ethoxycarbonyl and 2-ethylhexyloxycarbonyl), an amino group (preferably an amino group having 0 to 20 carbon atoms, examples thereof include an alkylamino group and an arylamino group, for example, amino, N,N-dimethylamino, N,N-diethylamino, N-ethylamino, and anilino), a sulfamoyl group (preferably a sulfamoyl group having 0 to 20 carbon atoms, for example, N,N-dimethylsulfamoyl and N-phenylsulfamoyl), an acyloxy group (preferably an acyloxy group having 1 to 20 carbon atoms, for example, acetyloxy, benzoyloxy), a carbamoyl group (preferably a carbamoyl group having 1 to 20 carbon atoms, for example, N,N-dimethylcarbamoyl and N-phenylcarbamoyl), an acylamino group (preferably an acylamino group having 1 to 20 carbon atoms, for example, acetylamino, and benzoylamino), a sulfonamide group (preferably a sulfonamide group having 0 to 20 carbon atoms, for example, methanesulfonamide, benzenesulfonamide, N-methylmethanesulfonamide, and N-ethylbenzenesulfonamide), a hydroxy group, a carboxyl group, a cyano group, a halogen atom (for example, a fluorine atom, a chlorine atom, a bromine atom, and an iodine atom). An alkyl group, an alkenyl group, an aryl group, a hetero cyclic group, an alkoxy group, an aryloxy group, an alkoxycarbonyl group, an amino group, an acylamino group, a cyano group, and a halogen atom are more preferable, and an alkyl group, an alkenyl group, a hetero cyclic group, an alkoxy group, an alkoxycarbonyl group, an amino group, an acylamino group, or a cyano group are particularly preferable.

When the compound, the substituent, and the like include an alkyl group, an alkenyl group, and the like, these may have straight chain shapes or branched shapes and may be substituted or unsubstituted. When an aryl group, a hetero cyclic group, and the like are included, these may be a single ring or condensed rings and may be substituted or unsubstituted.

In this specification, lists of respective technical matters such as temperatures or thicknesses, in addition to options of the substituent or the linking group of the compound, may be independently presented or may be combined with each other.

The weight average molecular weight of the specific polymer for forming the nonspherical polymer particles is preferably 5,000 or greater, more preferably 10,000 or greater, and particularly preferably 30,000 or greater. The upper limit thereof is preferably 1,000,000 or less and more preferably 200,000 or less.

—Measuring of Molecular Weights—

According to the invention, the molecular weight of the polymer refers to a weight average molecular weight, unless described otherwise. The weight average molecular weight in terms of standard polystyrene is calculated by the gel permeation chromatography (GPC). Basically, the molecular weight is a value measured by methods in Condition 1 or 2 (Priority) below, as the measurement method. Here, according to the type of the polymer, an appropriate eluent may be suitably selected to be used.

(Condition 1)

Column: TOSOH TSKgel Super AWM-H is connected.

Carrier: 10 mM of LiBr/N-methylpyrrolidone (Condition 2)

Column: A column connected to TOSOH TSKgel Super HZM-H, TOSOH TSKgel Super HZ4000, and TOSOH TSKgel Super HZ2000 is used.

Carrier: Tetrahydrofuran

In view of the enhancement of binding properties, the glass transition temperature (Tg) of the specific polymer is preferably 100° C. or less, more preferably 50° C. or less, and particularly preferably 30° C. or less. In view of suitability of manufacturing or stability of performances, the lower limit thereof is preferably −70° C. or greater and more preferably −50° C. or greater. If Tg is too low, particles cohere and adhere to each other during the ball mill dispersion. Otherwise, if Tg is too high, a favorable effect of adhering inorganic solid electrolyte particles can be obtained.

The specific polymer may be crystalline or noncrystalline. In the case of the crystalline polymer, the melting point is preferably 250° C. or less, more preferably 200° C. or less, and particularly preferably 180° C. or less. The lower limit is not particularly limited, but the lower limit is preferably 100° C. or greater and more preferably 120° C. or greater.

According to the invention, unless described otherwise, the Tg or the melting point of the specific polymer follows a measuring method (DSC measurement) employed in the examples below. The measurement of the created all-solid-state secondary battery can be performed, for example, by decomposing the battery, put electrodes into water, dispersing materials thereof, performing filtration, collecting remaining solids, and measuring the glass transition temperature in the method for measuring Tg described below.

The nonspherical polymer particles can be obtained by mechanically dispersing the polymer solids in the dispersion medium (poor solvent) or performing a pulverization treatment. That is, it is preferable to apply a breakdown method for pulverizing the solids and it is difficult to obtain favorable nonspherical particles in a build up method for forming particles from the solution. Examples of the breakdown method include a mechanical dispersion method. For example, a bead mill, a planetary mixer, a blade mixer, a roll mill, and a kneader are appropriately used. Among these, it is preferable that the nonspherical polymer particles are mechanically dispersed by a ball mill.

The ball mill refers to a device for forming fine particles by putting hard balls such as ceramic balls and powders of the material in a cylindrical container and rotating the hard balls and the powders by one type of pulverizers. As the pulverization method, it is preferable to use a planetary-type ball mill manufactured by FRITSCH GmbH, Germany. The planetary-type pulverization method is a method of performing pulverization by further adding strong centrifugal force to rotation and revolution movements and using the balls and the wall of the container. Materials of the container and the balls include agate, sintered alumina, tungsten carbide, chrome steel, stainless steel, zirconia, plastic polyamide, and silicon nitride. A container having the size of 12 mL to 500 mL can be obtained other than the container manufactured by FRITSCH GmbH, Germany. Balls having 2 mm to 40 mm can be obtained.

The size of the container and the size of the balls, and the appropriate insertion amounts in the respective cases are described.

In the case of 12 mL container: Ball diameter<2 mm (14 g), 5 mm (50 balls), and 10 mm (6 balls)

In the case of 45 mL container: Ball diameter<2 mm (50 g), 5 mm (80 balls), 10 mm (18 balls), and 15 mm (7 balls)

In the case of 80 mL container: Ball diameter<2 mm (85 g), 5 mm (250 balls), 10 mm (30 balls), 15 mm (10 balls), 20 mm (5 balls), 30 mm, and 40 mm In the case of 250 mL container: Ball diameter<2 mm (280 g), 5 mm (1,200 balls), 10 mm (50 balls), 15 mm (45 balls), 20 mm (15 balls), 30 mm (6 balls), and 40 mm In the case of 500 mL container: Ball diameter<2 mm (560 g), 5 mm (2,000 balls), 10 mm (100 balls), 15 mm (70 balls), 20 mm (25 balls), 30 mm (10 balls), and 40 mm (4 balls)

The dispersion time is not particularly limited, but the dispersion time is preferably 10 minutes to 10 hours or 30 minutes to 8 hours and more preferably 1 hour to 4 hours. The dispersion temperature is not particularly limited, but it is preferable that the dispersion is performed at the Tg of the pulverized polymer or less, since fine particles can be obtained. The dispersion temperature is preferably 50° C. or less, is more preferably 20° C. or less, and is even more preferably 0° C. or less. The weight ratio of the balls and the pulverized polymer is 0.05 g or less, preferably 0.02 g or less, and more preferably 0.01 g or less with respect to 1 g of the balls. The average particle diameter of the pulverized polymer changes according to the materials, the used container, the ball diameter, and the dispersion time. For example, pulverization is performed at 380 rpm for four hours at 25° C. by using a 45 mL zirconia container and 180 balls having the ball diameter of 5 mm, so as to obtain nonspherical polymer particles having the size of about 1 μm.

The average particle diameter of the nonspherical polymer particles is preferably 0.01 μm or greater, more preferably 0.05 μm or greater, and particularly preferably 0.1 μm or greater. The upper limit thereof is preferably 500 μm or less, more preferably 100 μm or less, even more preferably 10 μm or less, and particularly preferably 5 μm or less.

If variations of the particles are counted from finer particles, the diameter of the particles occupying 10% of the total number is defined as d10, the diameter (median size) of the particles occupying 50% of the total number is defined as d50, and the diameter of the particles occupying 90% of the total number is defined as d90. At this point, as the size index of the dispersion, D=(d90-d10)/d50. As D is greater, the variation of the particles becomes greater. D is preferably 1.5 or greater, more preferably 2 or greater, and even more preferably 3 or greater. The upper limit thereof is not particularly limited, but the upper limit is generally 10,000 or less and practically 10 or less.

According to the invention, unless described otherwise, the particle diameter or the variation (D) of the polymer particles is measured in the condition measured in the following examples.

When the inorganic solid electrolyte has a particle shape, it is preferable that the particle diameter of the polymer particles is smaller than the average particle diameter of the inorganic solid electrolyte. If the size of the polymer particles is caused to be in the range descried above, it is possible to realize the favorable adhesiveness and the suppression of the interface resistance.

With respect to the created all-solid-state secondary battery, the measurement can be performed, for example, by decomposing the battery, releasing the electrodes, measuring the electrode material in conformity with the method of the particle diameter measurement of the polymer described below, and excluding the measured value of the particle diameter of the particles other than the polymer which is measured in advance.

The blending amount of the specific polymer is preferably 0.1 parts by mass or greater, more preferably 0.3 parts by mass or greater, and particularly preferably 1 part by mass or greater with respect to 100 parts by mass of the solid electrolyte (including an active substance, in case of being used). The upper limit is preferably 50 parts by mass or less, more preferably 20 parts by mass or less, and particularly preferably 10 parts by mass or less.

With respect to the solid electrolyte composition, the content of the polymer particles is preferably 0.1 mass % or greater, more preferably 0.3 mass % or greater, and particularly preferably 1 mass % or greater in the solid component. The upper limit thereof is preferably 50 mass % or less, more preferably 20 mass % or less, and particularly preferably 10 mass % or less.

If the polymer particles are used in the range described above, compatibility between the adherence of the inorganic solid electrolyte and the suppression of the interface resistance can be more effectively realized.

The specific polymer may be used singly or two or more types thereof may be used in combination. The specific polymer may be used in combination with other particles.

The nonspherical polymer particles may be made of only a specific polymer for forming this or may be formed in a state in which other types of materials (polymers, low molecular compounds, inorganic compounds, or the like) are included. Preferably, the nonspherical polymer particles are particles made of only a constituent specific polymer.

(Lithium Salt)

In the all-solid-state secondary battery of the invention, a lithium salt may be included in the solid electrolyte composition. As the lithium salt, a lithium salt that is generally used in a product of this type is preferable, and the type of the lithium salt is not particularly limited, but lithium salts described below are preferable.

(L-1) Inorganic lithium salt: An inorganic fluoride salt such as $LiPF_6$, $LiBF_4$, $LiAsF_6$, and $LiSbF_6$; a perhalogen acid salt such as $LiClO_4$, $LiBrO_4$, and $LiIO_4$; an inorganic chloride salt such as $LiAlCl_4$; and the like.

(L-2) Fluorine-containing organic lithium salt: a perfluoroalkane sulfonic acid salt such as $LiCF_3SO_3$; a perfluoroalkane sulfonylimide salt such as $LiN(CF_3SO_2)_2$, $LiN(CF_3CF_2SO_2)_2$, $LiN(FSO_2)_2$, and $LiN(CF_3SO_2)(C_4F_9SO_2)$; a perfluoroalkane sulfonylmethide salt such as $LiC(CF_3SO_2)_3$; a fluoroalkyl fluoride phosphoric acid salt such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$; and the like.

(L-3) Oxalatoborate salt: lithium bis(oxalato)borate, lithium difluorooxalatoborate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)$ are preferable, and a lithiumimide salt such as $LiPF_6$, $LiBF_4$, $LiN(Rf^1SO_2)_2$, $LiN(FSO_2)_2$, and LiN $(Rf^1SO_2)(Rf^2SO_2)$ is still more preferable. Here, each of $Rf^1$ and $Rf^2$ represents a perfluoroalkyl group.

The content of the lithium salt is preferably 0.1 parts by mass or greater and more preferably 0.5 parts by mass or greater with respect to 100 parts by mass of the solid electrolyte. The upper limit is preferably 10 parts by mass or less and more preferably 5 parts by mass or less.

The electrolyte used in the electrolytic solution may be used singly or two or more types thereof may be arbitrarily used in combination.

(Dispersion Medium)

In the solid electrolyte composition according to the invention, the dispersion medium in which the respective components are dispersed may be used. Examples of the dispersion medium include a water soluble organic solvent. Specific examples thereof include the followings.

Aliphatic Compound

Hexane, heptane, cyclohexane, methylcyclohexane, octane, pentane, cyclopentane, and the like Halogenated Hydrocarbon Compound Methylene chloride, chloroform, dichloromethane, dichloroethane, carbon tetrachloride, trichloroethylene, tetrachloroethylene, epichlorohydrin, monochlorobenzene, orthodichlorobenzene, allyl chloride, HCFC, methyl monochloroacetate, ethyl monochloroacetate, monochloroacetate, trichloroacetate, methyl bromide, methyl iodide, tri(tetra) chloroethylene, and the like Alcohol Compound Methyl alcohol, ethyl alcohol, 1-propyl alcohol, 2-propyl alcohol, 2-butanol, ethylene glycol, propylene glycol, glycerine, 1,6-hexanediol, cyclohexanediol, sorbitol, xylitol, 2-methyl-2,4-pentanediol, 1,3-butanediol, 1,4-butanediol, and the like Ether Compound (Including Hydroxy Group-Containing Ether Compound)

Dimethyl ether, diethyl ether, diisopropyl ether, dibutyl ether, t-butylmethyl ether, cyclohexylmethyl ether, anisole, tetrahydrofuran, alkylene glycol alkyl ether (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, dipropylene glycol monomethyl ether, tripropylene glycol monomethyl ether, diethylene glycol monobutyl ether, or the like)

Ester Compound

Ethyl acetate, ethyl lactate, 2-(1-methoxy)propyl acetate, propylene glycol 1-monomethyl ether 2-acetate, and the like Ketone Compound Acetone, methyl ethyl ketone, methyl isobutyl ketone, cyclohexanone, 2-heptanone, and the like Nitrile Compound Acetonitrile and the like Amide Compound N,N-dimethylformamide, 1-methyl-2-pyrrolidone, 2-pyrrolidinone, 1,3-dimethyl-2-imidazolidinone, ε-caprolactam, formamide, N-methylformamide, acetoamide, N-methylacetoamide, N,N-dimethylacetoamide, N-methylpropaneamide, hexamethylphosphoric triamide, and the like Sulfoxide Compound Dimethyl sulfoxide and the like Aromatic Compound Benzene, toluene, xylene, and the like According to the invention, among these, it is preferable to use an ether compound solvent, a ketone compound solvent, an aromatic compound solvent, and an aliphatic compound solvent. With respect to the dispersion medium, the boiling point in the normal pressure (1 atmospheric pressure) is preferably 80° C. or greater and more preferably 100° C. or greater. The upper limit thereof is preferably 220° C. or less and more preferably 160° C. or less.

The solubility of the specific polymer to the dispersion medium at 20° C. is preferably less than 20 mass %, more preferably less than 10 mass %, and particularly preferably less than 3 mass %. The lower limit is practically 0.01 mass % or greater.

The solubility of the dispersion medium to water at 20° C. is preferably 5 mass % or less, more preferably 3 mass % or less, and particularly preferably 1 mass % or less. The lower limit thereof is practically 0.001 mass % or greater.

The dispersion medium above may be used singly or two or more types thereof may be used in combination.

(Positive Electrode Active Substance)

The positive electrode active substance is contained in the solid electrolyte composition according to the invention. In this manner, a composition for a positive electrode material can be made. Transition metal oxide is preferably used in the positive electrode active substance. Among them, transition metal oxide having a transition element $M^a$ (1 type or more elements selected from Co, Ni, Fe, Mn, Cu, and V) is preferable. A mixed element $M^b$ (an element in Group 1 (Ia) of the periodic table of metal other than lithium, an element in Group 2 (IIa), Al, Ga, In, Ge, Sn, Pb, Sb, Bi, Si, P, B, and the like) may be mixed. Examples of this transition metal oxide include a specific transition metal oxide including oxide expressed by any one of Formulae (MA) to (MC) below or include $V_2O_5$ and $MnO_2$, as additional transition metal oxide. A particle-state positive electrode active substance may be used in the positive electrode active substance. Specifically, it is possible to use a transition metal oxide to which a lithium ion can be reversibly inserted or released, but it is preferable to use the specific transition metal oxide described above.

Examples of the transition metal oxide appropriately include oxide including the transition element $M^a$. At this point, the mixed element $M^b$ (preferably Al) and the like are mixed. The mixture amount is preferably 0 mol % to 30 mol % with respect to the amount of the transition metal. It is more preferable that the transition element obtained by synthesizing elements such that the molar ratio of $Li/M^a$ becomes 0.3 to 2.2.

[Transition Metal Oxide Expressed by Formula (MA) (Layered Rock Salt Structure)]

As the lithium-containing transition metal oxide, metal oxide expressed by the following formula is preferable.

$$Li_aM^1O_b \quad \text{(MA)}$$

In the formula, $M^1$ has the same as $M^a$ above. a represents 0 to 1.2 (preferably 0.2 to 1.2) and preferably represents 0.6 to 1.1. b represents 1 to 3, and preferably 2. A portion of $M^1$ may be substituted with the mixed element $M^b$. The transition metal oxide expressed by Formula (MA) above typically has a layered rock salt structure.

The transition metal oxide according to the invention is more preferably expressed by the following formulae.

$$Li_gCoO_k \quad \text{(MA-1)}$$

$$Li_gNiO_k \quad \text{(MA-2)}$$

$$Li_gMnO_k \quad \text{(MA-3)}$$

$$Li_gCo_jNi_{1-j}O_k \quad \text{(MA-4)}$$

$$Li_gNi_jMn_{1-j}O_k \quad \text{(MA-5)}$$

$Li_gCo_jNi_iAl_{1-j-i}O_k$ (MA-6)

$Li_gCo_jNi_iMn_{1-j-i}O_k$ (MA-7)

Here, g has the same meaning as a above. j represents 0.1 to 0.9. i represents 0 to 1. However, 1-j-i becomes 0 or greater. k has the same meaning as b above. Specific examples of the transition metal compound include $LiCoO_2$ (lithium cobalt oxide [LCO]), $LiNi_2O_2$ (lithium nickel oxide), $LiNi_{0.85}CO_{0.01}Al_{0.05}O_2$ (lithium nickel cobalt aluminum oxide [NCA]), $LiNi_{0.33}CO_{0.33}Mn_{0.33}O_2$ (lithium nickel cobalt manganese oxide [NMC]), and $LiNi_{0.5}Mn_{0.5}O_2$ (lithium manganese oxide).

Though partially overlapped, if the transition metal oxide expressed by Formula (MA) is indicated by changing the indication, the following are also provided as preferable examples.

$Li_gNi_xMn_yCo_zO_2(x>0.2, y>0.2, z\geq 0, x+y+z=1)$ (i)

Representative transition metal oxide thereof:
$Li_gNi_{1/3}Mn_{1/3}Co_{1/3}O_2$
$Li_gNi_{1/2}Mn_{1/2}O_2$ $Li_gNi_xCo_yAl_zO_2(x>0.7, y>0.1, 0.1>z\geq 0.05, x+y+z=1)$ (ii)

Representative transition metal oxide thereof:
$Li_gNi_{0.8}Co_{0.15}Al_{0.05}O_2$

[Transition Metal Oxide Expressed by Formula (MB) (Spinel-Type Structure)]

Among them, as the lithium-containing transition metal oxide, transition metal oxide expressed by Formula (MB) below is also preferable.

$Li_cM^2{}_2O_d$ (MB)

In the formula, $M^2$ has the same meaning as $M^a$ above. c represents 0 to 2 (preferably 0.2 to 2) and preferably represents 0.6 to 1.5. d represents 3 to 5, and preferably represents 4.

The transition metal oxide expressed by Formula (MB) is more preferably transition metal oxide expressed by the following formulae.

$Li_mMn_2O_n$ (MB-1)

$Li_mMn_pAl_{2-p}O_n$ (MB-2)

$Li_mMn_pNi_{2-p}O_n$ (MB-3)

m has the same meaning as c. n has the same meaning as d. p represents 0 to 2. Specific examples of the transition metal compound include $LiMn_2O_4$ and $LiMn_{1.5}Ni_{0.5}O_4$.

The transition metal oxide expressed by Formula (MB) is more preferably transition metal oxide expressed by the following formulae.

$LiCoMnO_4$ (a)

$Li_2FeMn_3O_8$ (b)

$Li_2CuMn_3O_8$ (c)

$Li_2CrMn_3O_8$ (d)

$Li_2NiMn_3O_8$ (e)

Among the above, in view of high capacity and high output, an electrode including Ni is more preferable.

[Transition Metal Oxide Expressed by Formula (MC)]

As the lithium-containing transition metal oxide, lithium-containing transition metal phosphorus oxide is preferably used. Among them, transition metal oxide expressed by Formula (MC) below is also preferable.

$Li_eM^3(PO_4)_f$ (MC)

In the formula, e represents 0 to 2 (preferably 0.2 to 2) and preferably 0.5 to 1.5. f represents 1 to 5 and preferably represents 0.5 to 2.

$M^3$ above represents one or more types of elements selected from V, Ti, Cr, Mn, Fe, Co, Ni, and Cu. $M^3$ above may be substituted with other metal such as Ti, Cr, Zn, Zr, and Nb, in addition to the mixed element $M^b$ above. Specific examples thereof include an olivine-type iron phosphate salt such as $LiFePO_4$ and $Li_3Fe_2(PO_4)_3$, iron pyrophosphates such as $LiFeP_2O_7$, cobalt phosphates such as $LiCoPO_4$, and a monoclinic nasicon-type vanadium phosphate salt such as $Li_3V_2(PO_4)_3$ (vanadium lithium phosphate).

The values of a, c, g, m, and e representing the composition of Li are values that are changed depending on charging and discharging, and are typically evaluated by the values in a stable state when Li is contained. In Formulae (a) to (e) above, the composition of Li is indicated with specific values, but this is changed depending on an operation of the battery in the same manner.

The average particle size of the positive electrode active substance is not particularly limited, but the average particle size is preferably 0.1 μm to 50 μm. In order to cause the positive electrode active substance to have a predetermined particle size, a general pulverizer and a general classifier may be used. The positive electrode active substance obtained by the baking method may be used after being washed with water, an acidic aqueous solution, an alkaline aqueous solution, or an organic dissolving agent.

The concentration of the positive electrode active substance is not particularly limited, but the concentration in the solid electrolyte composition is preferably 20 mass % to 90 mass % and more preferably 40 mass % to 80 mass % with respect to 100 mass % of the solid component.

The positive electrode active substance may be used singly or two or more types thereof may be used in combination.

(Negative Electrode Active Substance)

The negative electrode active substance may be contained in the solid electrolyte composition according to the invention. In this manner, a composition for the negative electrode material can be made. As the negative electrode active substance, an active substance to which a lithium ion can be reversibly inserted or released is preferable. The material is not particularly limited, and examples thereof include carbonaceous material, metal oxide such as tin oxide and silicon oxide, a single substance of lithium, a lithium alloy such as a lithium aluminum alloy, and metal that can form an alloy with lithium such as Sn or Si. Among these, the carbonaceous material or lithium composite oxide is preferably used in view of credibility. As the metal oxide, metal composite oxide that can occlude or release lithium is preferable. The material thereof is not particularly limited, but a material that contains titanium and/or lithium as the constituent component is preferable in view of characteristics at high current density.

The carbonaceous material used as the negative electrode active substance is a material that is substantially made of carbon. Examples thereof include petroleum pitch, natural graphite, artificial graphite such as vapor phase-grown graphite, and a carbonaceous material obtained by baking various synthetic resins such as a PAN-based resin or a furfuryl alcohol resin. Examples thereof further include various carbon fibers such as a PAN-based carbon fiber, a cellulose-based carbon fiber, a pitch-based carbon fiber, a vapor phase-grown carbon fiber, a dehydrated PVA-based carbon fiber, a lignin carbon fiber, a glass-state carbon fiber, and an active carbon fiber, a mesophase microsphere, a graphite whisker, and a flat plate-shaped graphite.

These carbonaceous materials may be divided into a hardly graphitizable carbon material and a graphite-based carbon material according to the degree of graphitization. The carbonaceous material preferably has surface intervals, density, and sizes of crystallite as disclosed in JP1987-22066A (JP-S62-22066A), JP1990-6856A (JP-H2-6856A), and JP1991-45473A (JP-H3-45473A). The carbonaceous material does not have to be a single material, and a mixture of natural graphite and artificial graphite disclosed in JP1993-90844A (JP-H5-90844A), graphite having a coating layer disclosed in JP1994-4516A (JP-H6-4516A), and the like can be used.

As the metal oxide that is applied as the negative electrode active substance, amorphous oxide is particularly preferable, and, further, chalcogenide which is a reaction product of a metal element and an element in Group 16 in the periodic table can be preferably used. The expression “amorphous” herein means to have a broad scattering band having a vertex in an area of 20° to 40° in 2θ values in the X-ray diffraction method using CuKα rays, and may have crystalline diffraction lines. The strongest strength of the crystalline diffraction lines seen at 40° to 70° in the 2θ values is preferably 100 times or less and more preferably 5 times or less in the diffraction line intensity in the vertex of a broad scattering band seen at 20° to 40° in the 2θ value, and it is particularly preferable that oxide does not have a crystalline diffraction line.

Among the compound groups made of amorphous oxide and chalcogenide, amorphous oxide and chalcogenide of a metalloid element are more preferable, and an element of Groups 13 (IIIB) to 15 (VB) in the periodic table, a single substance of Al, Ga, Si, Sn, Ge, Pb, Sb, or Bi or oxide made of a combination obtained by combining two or more types thereof, and chalcogenide are particularly preferable. Specific examples of preferable amorphous oxide and chalcogenide preferably include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. These may be composite oxide with lithium oxide, for example, $Li_2SnO_2$.

The average particle size of the negative electrode active substance is preferably 0.1 μM to 60 μm. In order to cause the negative electrode active substance to have a predetermined particle size, a well-known pulverizer and a well-known classifier are used. For example, a mortar, a ball mill, a sand mill, a vibrating ball mill, a satellite ball mill, a planetary ball mill, a swirling air stream-type jet mill, and a sieve are appropriately used. At the time of pulverizing, wet pulverization in which an organic solvent such as water or methanol coexist may be performed, if necessary. In order to obtain a desired particle diameter, classification is preferably performed. A pulverization method is not particularly limited, and a sieve, an air classifier, or the like can be used, if necessary. As the classification, both dry-type classification and wet-type classification can be used.

The chemical formula of the compound obtained by the baking method can be calculated in an inductive coupling plasma (ICP) emission spectrophotometric analysis method as a measuring method or can be calculated from a mass difference between particles before and after baking, as a simple method.

Examples of the negative electrode active substance that can be used together with an amorphous oxide negative electrode active substance mainly using Sn, Si, and Ge appropriately include a carbon material that can occlude and release lithium ion, lithium metal or lithium, lithium alloy, or metal that can be formed to an alloy with lithium.

The negative electrode active substance preferably contains a titanium atom. More specifically, since the volume of $Li_4Ti_5O_{12}$ is small when a lithium ion is occluded and released, quick charging-discharging properties are excellent, the deterioration of the electrode is prevented, and the lifespan of the lithium ion secondary battery can be improved. Therefore, $Li_4Ti_5O_{12}$ is preferable. Stability of the secondary battery in various use condition improves due to the combination between a specific negative electrode and a further specific electrolyte solution.

In the all-solid-state secondary battery according to the invention, it is preferable to apply the negative electrode active substance that contains an Si element. Generally, the Si negative electrode can occlude Li ions more than the current carbon negative electrode (graphite, acetylene black, or the like). That is, since the Li ion occlude amount increases per weight, it is possible to increase the battery capacity. As a result, there is an advantage of causing the battery driving time to be longer, and thus the usage thereof in a battery for vehicle is expected in the future. Meanwhile, it is known that the volume change accompanied by the occlusion and release of the Li ion is great. For example, when the volume expansion in the carbon negative electrode is about 1.2 times to 1.5 times, the volume expansion in the Si negative electrode may be about 3 times. If this expansion and contraction is repeated (charging and discharging are repeated), the durability of the electrode layer is insufficient, such that, for example, the contact easily becomes insufficient or the cycle life span (battery life span) becomes short, in some cases.

With the solid electrolyte composition according to the invention, in this electrode layer having great expansion and contraction, high durability (strength) thereof is exhibited, and thus the excellent advantages are exhibited more effectively.

The concentration of the negative electrode active substance is not particularly limited, but the concentration in the solid electrolyte composition is preferably 10 mass % to 80 mass % and more preferably 20 mass % to 70 mass % with respect to 100 mass % of the solid component.

The embodiment above describes an example in which a positive electrode active substance and a negative electrode active substance is contained in the solid electrolyte composition according to the invention, but the invention is not limited to thereto. For example, a paste including a positive electrode active substance and a negative electrode active substance as the polymercomposition that does not include the specific polymer may be prepared. At this point, it is preferable to contain the inorganic solid electrolyte layer. In this manner, the positive electrode material and the negative electrode material which are commonly used are combined, and the solid electrolyte composition relating to the preferable embodiment of the invention may be used to form an inorganic solid electrolyte layer. The conductive assistance may be suitably contained in the active substance layer of the positive electrode and the negative electrode, if necessary. General examples of the electron conductive material include a carbon fiber, such as graphite, carbon black, acetylene black, Ketjen black, and a carbon nanotube, metal powders, a metal fiber, and a polyphenylene derivative.

The negative electrode active substance may be used singly or two or more types thereof may be used in combination.

<Collector (Metallic Foil)>

It is preferable that an electron conductor that does not cause a chemical change is used as the collector of the positive•negative electrodes. As the collector of the positive electrode, in addition to aluminum, stainless steel, nickel, titanium, and the like, a product obtained by treating carbon, nickel, titanium, or silver on the surface of aluminum and stainless steel is preferable. Among them, aluminum and an aluminum alloy are more preferable. As the negative electrode collector, aluminum, copper, stainless steel, nickel, and titanium are preferable, and aluminum, copper, and a copper alloy are more preferable.

As the form of the collector, a sheet-shaped collector is commonly used, but a net, a punched collector, a lath body, a porous body, a foam body, a molded body of a fiber group, and the like can be used. The thickness of the collector is not particularly limited, but the thickness is preferably 1 μm to 500 μm. Unevenness is preferably formed on the collector surface by a surface treatment.

<Manufacturing of All-Solid-State Secondary Battery>

With respect to the manufacturing of the all-solid-state secondary battery, it is preferable to prepare the solid electrolyte composition described above. The method for manufacturing the solid electrolyte composition may be performed by the common method. For example, it is preferable to prepare the solid electrolyte composition by a first step of mixing the nonspherical polymer particles and the dispersion medium, mechanically dispersing the nonspherical polymer particles, and forming slurry liquid of the nonspherical polymer particles and a second step of further mechanically dispersing the slurry liquid of the polymer particles obtained as above in the presence of at least the inorganic solid electrolyte. The mechanical dispersion in the first step and/or the second step may be performed in any types of the dispersion method. However, among these, the ball mill dispersion method is preferable.

Manufacturing of the all-solid-state secondary battery may be performed by the common method. Specifically, examples of the method include a method for making an electrode sheet for a battery on which a film is formed by applying the solid electrolyte composition above on a metallic foil that becomes a collector. For example, the composition that forms the positive electrode material is applied on the metallic foil so as to form the film. Subsequently, the composition of the inorganic solid electrolyte is applied on the upper surface of the positive electrode active substance layer of the electrode sheet for the battery so as to form the film. In the same manner, it is possible to obtain a desired structure of the all-solid-state secondary battery by forming the film of the active substance of the negative electrode and providing the collector (metallic foil) on the negative electrode side. The method for applying the respective compositions may be performed by the common method. At this point, after the composition for forming the positive electrode active substance layer, the composition for forming the inorganic solid electrolyte layer, and the composition for forming the negative electrode active substance layer are respectively applied, it is preferable to perform the heating treatment. It is preferable that the heating temperature is the glass transition temperature of the nonspherical polymer particles or greater. Specifically, the heating temperature is preferably 30° C. or greater, more preferably 60° C. or greater, and most preferably 100° C. or greater. The upper limit thereof is preferably 300° C. or less and more preferably 250° C. or less. If the heating is performed in this temperature range, the polymer particles are appropriately softened, and the shape thereof can be appropriately maintained. Accordingly, with respect to the all-solid-state secondary battery, favorable binding properties and ion conductivity under the non-pressurization can be obtained.

It is preferable to perform pressurization while heating. The pressurization pressure is preferably 5 $kN/cm^2$ or greater, more preferably 10 $kN/cm^2$ or greater, and most preferably 20 $kN/cm^2$ or greater.

<Use of All-Solid-State Secondary Battery>

The all-solid-state secondary battery according to the invention can be applied to various uses. The use aspect is not particularly limited, but, if the all-solid-state secondary battery is mounted in an electronic device, examples thereof include a notebook personal computer, a pen input personal computer, a mobile computer, an electron book player, a cellular phone, a cordless phone slave unit, a pager, a handy terminal, a portable fax machine, a portable copying machine, a portable printer, a headphone stereo, a video movie, a liquid crystal television, a handy cleaner, a portable CD, a mini disc, an electric shaver, a transceiver, an electronic organizer, a calculator, a memory card, a portable tape recorder, radio, and a backup power supply. Examples of additional consumer use include an automobile, an electric motor vehicle, a motor, lighting equipment, a toy, a game machine, a load conditioner, a clock, a stroboscope, a camera, and medical equipment (a pacemaker, a hearing aid, and a shoulder massager). The all-solid-state secondary battery can be used for military or space. The all-solid-state secondary battery can be combined with a solar battery.

Among these, the all-solid-state secondary battery is preferably applied to an application that requires discharging properties at high capacity and a high rate. For example, in an electric storage facility and the like in which high capacity enhancement is expected in the future, high credibility is necessary, and thus compatibility between battery properties is required. A high capacity secondary battery is mounted on an electric car and the like, a use in which charging is performed everyday at home is assumed, and credibility at overcharging is further required. According to the invention, an excellent effect can be achieved in response to these use forms.

According to the preferable embodiment of the invention, respective applications as follows are provided.

A solid electrolyte composition (a composition for electrodes of a positive electrode or a negative electrode) that includes an active substance that can insert or release ion of metal belonging to Group 1 or 2 of the periodic table.

An electrode sheet for a battery obtained by forming a film of a solid electrolyte composition on a metallic foil.

An all-solid-state secondary battery including a positive electrode active substance layer, a negative electrode active substance layer, and an inorganic solid electrolyte layer, in which at least one of the positive electrode active substance layer, the negative electrode active substance layer, or the inorganic solid electrolyte layer is a layer formed of a solid electrolyte composition.

A method for manufacturing an electrode sheet for a battery by disposing the solid electrolyte composition on a collector, and performing heating at a predetermined temperature.

An all-solid-state secondary battery manufacturing method for manufacturing an all-solid-state secondary battery in the method for manufacturing an electrode sheet for a battery.

The all-solid-state secondary battery refers to a secondary battery that is formed of a positive electrode, a negative electrode, and an electrolyte which are all solid. In other words, the all-solid-state secondary battery is different from an electrolyte solution-type secondary battery in which a carbonate-based solvent is used as an electrolyte. Among these, the invention relates to an inorganic all-solid-state secondary battery. The all-solid-state secondary battery is classified into the organic (high molecular) all-solid-state secondary battery using a high molecular compound such as polyethylene oxide as an electrolyte and the inorganic all-solid-state secondary battery using Li—P—S, LLT, LLZ, or the like. A high molecular compound can be applied as binders of the positive electrode active substance, the negative electrode active substance, and the inorganic solid electrolyte particle, without preventing application to an inorganic all-solid-state secondary battery.

The inorganic solid electrolyte is different from the electrolyte (high molecular electrolyte) using a high molecular compound as an ion conducting medium, and the inorganic compound becomes an ion conducting medium. Specific examples thereof include Li—P—S, LLT or LLZ above. The inorganic solid electrolyte itself does not release a positive ion (Li ion), but exhibits an ion transporting function. In contrast, an electrolyte solution or a material that becomes a supply source of an ion that is added to a solid electrolyte layer and releases a positive ion (Li ion) is called an electrolyte, but when the electrolyte is differentiated from the electrolyte as the ion transferring material, the electrolyte is called an “electrolyte salt” or a “supporting electrolyte”. Examples of the electrolyte salt include lithium bistrifluoromethane sulfone imide (LiTFSI).

In this specification, the expression “composition” means a mixture in which two or more components are evenly mixed. However, evenness may be substantially maintained, and aggregation or uneven distribution may partially occur in a range in which a desired effect is exhibited.

EXAMPLES

Hereinafter, the invention is specifically described with reference to examples, but the invention is not limited thereto. In the examples below, the expressions “part” and “%” are on a mass basis, unless otherwise described.

Synthesization of Polymer

Synthesization of (A-5)

5 g of propylene glycol monomethyl ether acetate (PGMEA) was added to a 200 mL three-necked flask and was heated to 80° C. under a nitrogen gas stream. 15.5 g of benzyl methacrylate, 1.0 g of methacrylic acid, 3.2 g of 2-hydroxyethyl methacrylate, and 45 g of a PGMEA solution of 0.23 g of V-601 (manufactured by Wako Pure Chemical Industries, Ltd.) were dripped to this over four hours. After the dripping was completed, heating and stirring were performed at 80° C. over two hours. The obtained polymer solution was crystallized in 1 L of hexane/ethyl acetate (80/20), and the polymer was vacuum-dried at 80° C. for 6 hours. The weight average molecular weight of the obtained polymer was 52,300, and the glass transition temperature was 23° C.

Figure 4:
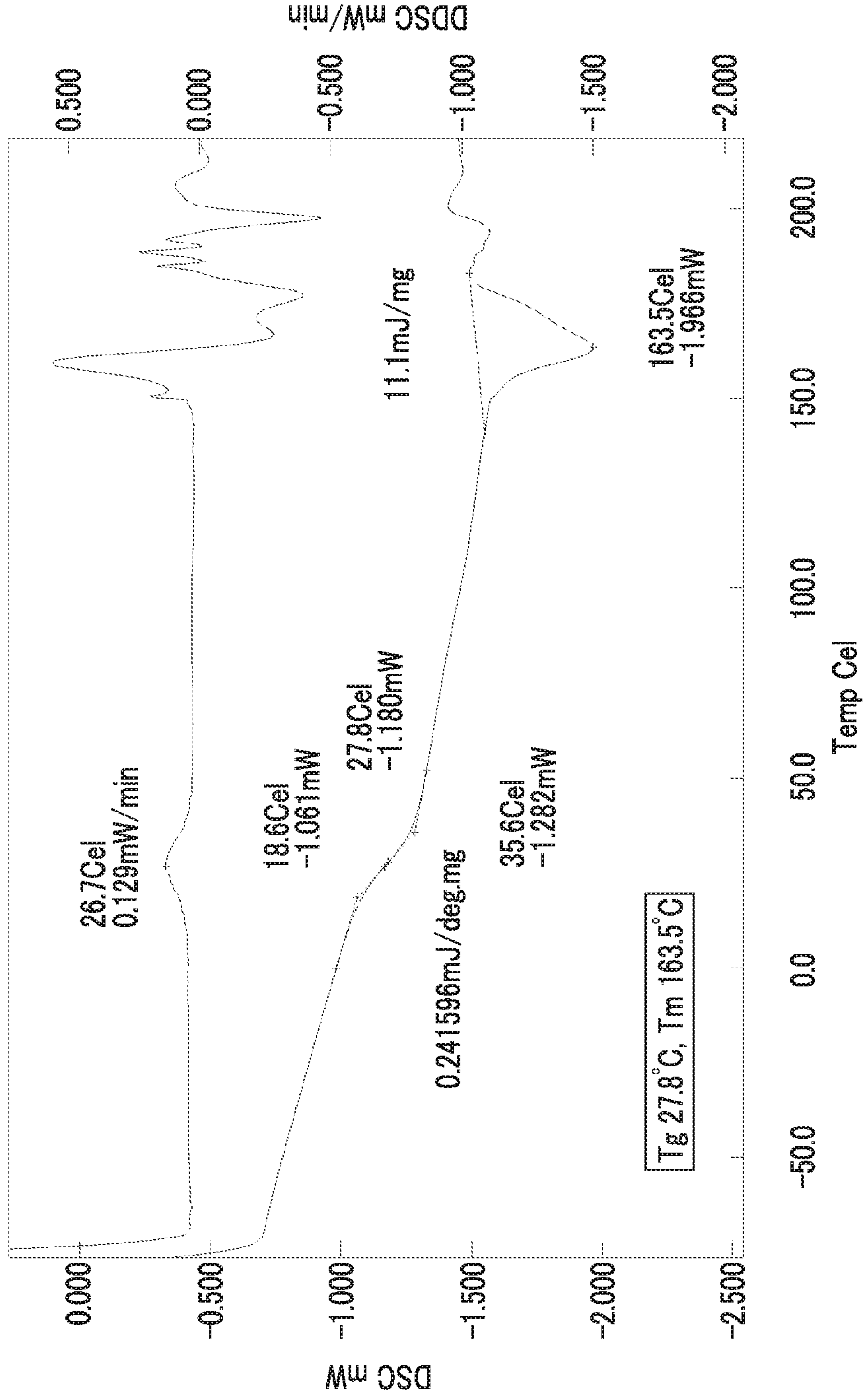
FIG. 4 is a graph illustrating results of DSC measurement of polymer particles prepared in an example.

For reference, DSC measurement results of the polymer A-5 were presented in FIG. 4.

Synthesization of (A-7)

5 g of propylene glycol monomethyl ether acetate (PGMEA) was added to a 200 mL three-necked flask and was heated to 80° C. under a nitrogen gas stream. 10.3 g of isobutyl methacrylate, 1.0 g of methacrylic acid, 3.7 g of dimethylaminoethyl methacrylate, 4.0 g of M-90G (manufactured by Shin-Nakamura Chemical Co., Ltd.), and 45 g of a PGMEA solution of 0.23 g of V-601 (manufactured by Wako Pure Chemical Industries, Ltd.) were dripped to this over four hours. After the dripping was completed, heating and stirring were performed at 80° C. over two hours. The obtained polymer solution was crystallized in 1 L of hexane/ethyl acetate (90/10), and the polymer was vacuum-dried at 80° C. for 6 hours. The weight average molecular weight of the obtained polymer was 67,400, and the glass transition temperature was −12° C.

Synthesization of (A-14)

5 g of propylene glycol monomethyl ether acetate (PGMEA) was added to a 200 mL three-necked flask and was heated to 80° C. under a nitrogen gas stream. 13.7 g of 2-ethylhexyl methacrylate, 3.4 g of glycidyl methacrylate, 1.0 g of methacrylic acid, 1.8 g of dimethylaminoethyl methacrylate, and 45 g of the PGMEA solution of 0.23 g of V-601 (manufactured by Wako Pure Chemical Industries, Ltd.) were dripped to this over four hours. After the dripping was completed, heating and stirring were performed at 80° C. over two hours. The obtained polymer solution was crystallized in 1 L of hexane, and the polymer was vacuum-dried at 80° C. for 6 hours. The weight average molecular weight of the obtained polymer was 64,300, and the glass transition temperature was −5° C.

Synthesization of (A-24)

3 g of propylene glycol monomethyl ether acetate (PGMEA) was added to a 200 mL three-necked flask and was heated to 80° C. under a nitrogen gas stream. 3.4 g of acrylonitrile, 0.5 g of methacrylic acid, 3.4 g of glycidyl methacrylate, 2.0 g of M-90G (manufactured by Shin-Nakamura Chemical Co., Ltd.), 0.9 g of dimethylaminoethyl methacrylate, and 40 g PGMEA solution of 0.23 g of V-601 (manufactured by Wako Pure Chemical Industries, Ltd.) were dripped to this over four hours. After the dripping was completed, heating and stirring were performed at 80° C. over two hours. The obtained polymer solution was crystallized in 1 L of hexane, and the polymer was vacuum-dried at 80° C. for 6 hours. The weight average molecular weight of the obtained polymer was 49,800, and the glass transition temperature was 7° C.

Synthesization of (A-29)

3 g of propylene glycol monomethyl ether acetate (PGMEA) was added to a 200 mL three-necked flask and was heated to 80° C. under a nitrogen gas stream. 8.5 g of N-vinylpyrrolidone, 2.0 g of methacrylic acid, 3.2 g of 2-hydroxyethyl methacrylate, and 40 g of PGMEA solution of 0.23 g of V-601 (manufactured by Wako Pure Chemical Industries, Ltd.) were dripped to this over four hours. After the dripping was completed, heating and stirring were performed at 80° C. over two hours. The obtained polymer solution was crystallized in 1 L of hexane, and the polymer was vacuum-dried at 80° C. for 6 hours. The weight average molecular weight of the obtained polymer was 76,200, and the glass transition temperature was 15° C.

Synthesization of (A-56)

13.2 g of dicyclohexylmethane-4,4'-diisocyanate, 2.6 g of 1,4-butanediol, 6.5 g of polytetramethylene glycol (weight average molecular weight: 650), 0.8 g of BLEMMER GLM (manufactured by NOF Corporation), and 0.7 g of 2,2-(bishydroxymethyl)propionic acid were added to a 200 mL three-necked flask and 56 g of tetrahydrofuran was further added, and heating and dissolving were performed at 60° C. 50 mg of NEOSTANE U-600 (manufactured by Nitto Kasei Co., Ltd.) was added over 10 minutes, and heating and stirring were performed at 60° C. for five hours. 10 mL of methanol was added to the obtained polymer solution and stirred at 60° C. for one hour, and polymerization was stopped. The obtained polymer solution was crystallized in 1 L of methanol, and the polymer solid was vacuum-dried at 80° C. for 6 hours. The weight average molecular weight of the obtained polymer was 126,900, and the glass transition temperature was −15° C.

Synthesization of (A-57)

12.8 g of methylenediphenyl 4,4'-diisocyanate, 2.6 g of 1,4-butanediol, 6.5 g of polytetramethylene glycol (weight average molecular weight: 650), 0.7 g of 2,2-(bishydroxymethyl)propionic acid, and 0.8 g of N-butyl diethanolamine were added to a 200 mL three-necked flask and 60 g of tetrahydrofuran was further added, and heating and dissolving were performed at 60° C. 50 mg of NEOSTANE U-600 (manufactured by Nitto Kasei Co., Ltd.) was added over 10 minutes, and heating and stirring were performed at 60° C. for five hours. 10 mL of ethanol was added to the obtained polymer solution and stirred at 60° C. for one hour, and polymerization was stopped. The obtained polymer solution was crystallized in 1 L of methanol, and the polymer solid was vacuum-dried at 80° C. for 6 hours. The weight average molecular weight of the obtained polymer was 104,200, and the glass transition temperature was −28° C.

EXAMPLES

Synthesization of Sulfide-Based Inorganic Solid Electrolyte (Li—P—S-Based Glass)

2.42 g of lithium sulfide ($Li_2S$, manufactured by Sigma-Aldrich Co., LLC., purity>99.98%), and 3.90 g of phosphorus pentasulfide ($P_2S_5$, manufactured by Sigma-Aldrich Co., LLC., purity>99%) were respectively weighed in a glove box under argon atmosphere (dew point: −70° C.), and were introduced to agate mortar, and were mixed for five minutes by using agate pestle. $Li_2S$ and $P_2S_5$ satisfied $Li_2S$:$P_2S_5$=75:25 in the molar ratio.

66 zirconia beads having the diameter of 5 mm were introduced to a 45 mL zirconia container (manufactured by Fritsch Japan Co., Ltd.), the total amounts of lithium sulfide and phosphorus pentasulfide described above were introduced, and the container was completely sealed under argon atmosphere. The container was set to a planet ball mill P-7 manufactured by Fritsch Japan Co., Ltd., and 6.20 g of a yellow powder sulfide solid electrolyte material (Li—P—S-based glass) was obtained by performing mechanical milling at the temperature of 25° C. and the number of rotations of 510 rpm for 20 hours.

Preparing of Solid Electrolyte Composition (Slurry)

(1) 180 zirconia beads having the diameter of 5 mm were introduced to a 45 mL zirconia container (manufactured by Fritsch Japan Co., Ltd.), 1.0 g of the exemplary compound (A-5) and 15.0 g of toluene as a dispersion medium were introduced, the container was set to the planet ball mill P-7 manufactured by Fritsch Japan Co., Ltd., and mechanical dispersion was continued at 25° C. and the number of rotations of 300 rpm for two hours, so as to obtain dispersion liquid of nonspherical polymer particles obtained by pulverizing the exemplary compound (A-5). The average particle diameter in terms of sphere of these polymer particles was 0.85 μm, and the degree of the dispersion satisfied D=3.6. The flatness was presented in the table.

(2) 9.0 g of an inorganic solid electrolyte LLT (manufactured by Toshima Manufacturing Co., Ltd.) and 0.2 g of LiTFSI (manufactured by Sigma-Aldrich Co., LLC.) were introduced to the nonspherical polymer dispersion liquid. Thereafter, the container was set to the planet ball mill P-7 manufactured by Fritsch Japan Co., Ltd., and mixing was continued at 25° C. and the number of rotations of 300 rpm for two hours, so as to obtain a solid electrolyte composition S-1. Other exemplary solid electrolyte compositions were prepared in the same method (see Table 1 below). Particles having different particle diameters such as S-2 and S-3 were prepared by changing conditions of the treatment by the ball mill.

The nonspherical polymer formed in the treatment (1) was sufficiently finely pulverized. Since LLT newly introduced in (2) had greater particle diameters and the amount thereof was great, it is interpreted that the pulverization of the LLT preferentially occurred in the treatment (2). Accordingly, in the milling of (2), the shape of the particles of the nonspherical polymer hardly changed, the polymer particle diameter in the product reflected the particle diameter of the single polymer in (1) almost the same.

TABLE 1

| | Solid electrolyte | | Polymer particles | | | | | | | | Lithium salt | | |
|---|---|---|---|---|---|---|---|---|---|---|---|---|---|
| Composition | | Mass % | | Mass % | Particle diameter μm | Variation D | Molecular weight | Tg (° C.) | Flatness f1 | Flatness f2 | | Mass % | Dispersion medium |
| S-1 | LLT | 90 | A-5 | 8 | 0.85 | 2.31 | 52300 | 23 | 1.64 | 1.45 | LiTFSI | 2 | Toluene |
| S-2 | LLT | 95 | A-5 | 4 | 0.67 | 1.95 | 52300 | 23 | 1.78 | 1.65 | LiTFSI | 1 | Toluene |
| S-3 | LLT | 95 | A-5 | 5 | 0.95 | 2.10 | 52300 | 23 | 2.13 | 1.87 | — | — | Toluene |
| S-4 | LLZ | 95 | A-7 | 4 | 0.92 | 1.88 | 67400 | −12 | 2.32 | 2.13 | LiTFSI | 1 | Xylene |
| S-5 | LLZ | 95 | A-14 | 4 | 0.89 | 2.57 | 64300 | −5 | 1.69 | 1.44 | LiTFSI | 1 | Xylene |
| S-6 | LLZ | 95 | A-24 | 4 | 0.78 | 3.22 | 49800 | 7 | 1.74 | 1.45 | LiTFSI | 1 | Xylene |
| S-7 | LLZ | 95 | A-29 | 4 | 0.88 | 3.76 | 76200 | 15 | 1.98 | 1.56 | LiTFSI | 1 | Xylene |
| S-8 | LLZ | 95 | A-56 | 4 | 0.96 | 3.26 | 126900 | −15 | 2.12 | 1.97 | LiTFSI | 1 | Xylene |
| S-9 | LLZ | 95 | A-57 | 4 | 0.88 | 4.84 | 104200 | −28 | 2.07 | 1.76 | LiTFSI | 1 | Xylene |
| S-10 | LLZ | 95 | A-57 | 4 | 0.57 | 2.46 | 104200 | −28 | 1.95 | 1.35 | LiTFSI | 1 | Dibutyl ether |
| S-11 | Li—P—S | 95 | A-62 | 5 | 0.95 | 2.43 | 63400 | 36 | 1.97 | 1.40 | — | — | Heptane |
| T-1 | LLT | 75 | SBR | 23 | 10.8 | 1.23 | 152300 | −56 | 1.42 | 1.21 | LiTFSI | 2 | — |
| T-2 | LLT | 95 | PTFE | 4 | 0.91 | 1.14 | 13200 | 126 | 1.32 | 1.13 | LiTFSI | 1 | Xylene |
| T-3 | LLT | 95 | AB-St | 5 | 0.25 | 0.98 | 54600 | 5 | 1.08 | 1.02 | — | — | Xylene |
| T-4 | LLT | 95 | AB-MA-St | 5 | 0.25 | 0.87 | 65800 | 12 | 1.05 | 1.01 | — | — | Xylene |

<Note of Table 1>

(1) SBR: Styrenebutadiene rubber

Nipol NS 116R (Product name) manufactured by ZEON Corporation (2) PTFE: Polytetrafluoroethylene The PTFE resin synthesized by the common method was mechanically dispersed by a ball mill in the same condition as in the examples above.

(3) AB-St: Butyl acrylate-styrene copolymer

Synthesization was performed in conformity with the disclosure of paragraph "0090" of WO2011/105574A. The synthesization followed the emulsification polymerization method.

(4) AB-MA-St: Butyl acrylate-methacrylic acid-styrene copolymer

Synthesization was performed in conformity with the disclosure of paragraph "0087" of JP2013-008611A. The synthesization followed the emulsification polymerization method.

(5) LLT: $Li_x$—$La_yTiO_3$ [x=0.3 to 0.7 and y=0.3 to 0.7]

(6) LLZ: $Li_7La_3Zr_2O_{12}$ (7) LiTFSI: Lithium bis(trifluoromethanesulfonyl)imide (8) Flatness f1: MaxL/MinL See FIG. 2

(9) Flatness f2: Feret diameter/Heywood diameter See FIG. 2

(10) Variation D: (d90-d10)/d50

(11) Li—P—S: Li—P—S-based glass synthesized as above (Manufacturing Example of Solid Electrolyte Sheet)

The solid electrolyte composition manufactured above was applied on an aluminum foil having a thickness of 20 μm by an applicator of which clearance can be adjusted, heating was performed at 80° C. for one hour, and heating was further performed at 110° C. for one hour, so as to dry a coating solvent. Thereafter, a copper foil having the thickness of 20 μm was matched by using a heating and pressing machine, heating and pressurization were performed to have arbitrary density, so as to obtain a solid electrolyte sheet. The film thickness of the electrolyte layer was 30 μm. Other solid electrolyte sheets were also prepared in the same method.

Preparation Example of Composition for Positive Electrode of Secondary Battery 100 parts by weight of lithium cobalt oxide, 5 parts by weight of acetylene black, 75 parts by weight of the solid electrolyte composition S-1 obtained above, and 270 parts by weight of N-methylpyrrolidone were added to a planetary mixer (TK HIVIS MIX, manufactured by PRIMIX Corporation), and were stirred for one hour at 40 rpm.

Preparation Example of Composition for Negative Electrode of Secondary Battery 100 parts by weight of lithium titanate (Product name: "ENERMIGHT LT-106", manufactured by Ishihara Sangyo Kaisha, Ltd.), 5 parts by weight of acetylene black, 75 parts by weight of the solid electrolyte composition S-1 obtained above, and 270 parts by weight of N-methylpyrrolidone were added to a planetary mixer (TK HIVIS MIX, manufactured by PRIMIX Corporation), and were stirred for one hour at 40 rpm.

Manufacturing Example of Positive Electrode Sheet for Secondary Battery

The composition for the positive electrode of the secondary battery obtained above was applied on an aluminum foil having a thickness of 20 μm with an applicator having arbitrary clearance, and heating was performed for 1 hour at 80° C. and further performed for 1 hour at 110° C., so as to dry the applied composition. Thereafter, heating and pressurizing were performed by using a heat press machine so as to have an arbitrary density, such that a positive electrode sheet for a secondary battery was obtained.

Manufacturing Example of Electrode Sheet for Secondary Battery

The solid electrolyte composition obtained above was applied on the positive electrode sheet for the secondary battery obtained above with an applicator having arbitrary clearance, and heating was performed for 1 hour at 80° C. and further performed for 1 hour at 110° C., so as to dry the solid electrolyte composition. Thereafter, the composition for the negative electrode of the secondary battery obtained above was applied, heating was performed for 1 hour at 80° C. and further performed for 1 hour at 110° C., so as to dry the composition. A copper foil having the thickness of 20 μm was matched on the negative electrode layer, heating and pressurization were performed to have arbitrary density by using a heating and pressing machine, so as to obtain a solid electrolyte sheet for a secondary battery. At this point, the respective compositions may be applied at the same time, applying, drying, and pressing may be performed at the same time or may be performed sequentially. The respective compositions may be applied on different substrates and be laminated by transfer.

<Evaluation of Binding Properties>

When an adhesive tape was bonded to the electrode sheet and peeled in a constant speed, binding properties were represented by a ratio of the area of the portion which was not peeled.

A: 100%

B: 95% or greater and less than 100%

C: 80% or greater and less than 95%

D: 50% or greater and less than 80%

E: Less than 50%

<Measuring of Ion Conductance>

A coin battery was manufactured by cutting the solid electrolyte sheet obtained above or the secondary battery electrode sheet obtained above into a disc shape with a diameter of 14.5 mm and inputting the cut solid electrolyte sheet or the cut secondary battery electrode sheet to a stainless steel 2032-type coin case combined with a spacer or a washer. The coin battery was inserted from the outside of the coin battery in a jig that can apply a pressure between electrodes to be used in the electrochemical measurement. The pressure between the electrodes was 500 $kgf/cm^2$.

The ion conductance was obtained by using the obtained coin battery by the alternating current impedance method in the thermostat of 30° C. At this point, in the pressurization of the coin battery, the test body illustrated in FIG. 2 was used. Reference numeral 11 refers to an upper support plate, Reference numeral 12 refers to a lower support plate, Reference numeral 13 refers to a coin battery, Reference numeral 14 refers to a coin case, Reference numeral 15 refers to an electrode sheet (a solid electrolyte sheet or a secondary battery electrode sheet), and Reference numeral S refers to a screw. In Table 3, the pressurization state represents a case where the ion conductance was measured in a state in which the coin battery is interposed between jigs, and the non-pressurization state represents a case where the ion conductance was measured without pressurizing the coin battery.

TABLE 2

| No | Positive electrode | Electrolyte | Negative electrode | Binding properties | Ion conductivity (mS/cm) Pressurization | Non-pressurization |
|---|---|---|---|---|---|---|
| | Cell configuration | | | | | |
| 101 | — | S-1 | — | C | 0.17 | 0.15 |
| 102 | LMO S-1 | S-1 | LTO S-1 | C | 0.1 | 0.09 |
| 103 | LMO S-l | S-1 | Graphite S-1 | B | 0.11 | 0.1 |
| 104 | — | S-2 | — | B | 0.15 | 0.14 |
| 105 | LCO S-2 | S-2 | Graphite S-2 | B | 0.09 | 0.08 |
| 106 | — | S-3 | — | B | 0.09 | 0.08 |
| 107 | NMC S-3 | S-3 | Graphite S-3 | B | 0.06 | 0.06 |
| 108 | — | S-4 | — | B | 0.17 | 0.17 |
| 109 | NMC S-4 | S-4 | LTO S-4 | B | 0.11 | 0.11 |
| 110 | — | S-5 | — | B | 0.16 | 0.16 |
| 111 | LMO S-5 | S-5 | LTO S-5 | B | 0.12 | 0.12 |
| 112 | LMO S-6 | S-6 | LTO S-6 | B | 0.16 | 0.15 |
| 113 | LMO S-7 | S-7 | LTO S-7 | A | 0.12 | 0.11 |
| 114 | LMO S-8 | S-8 | LTO S-8 | A | 0.18 | 0.17 |
| 115 | LMO S-9 | S-9 | LTO S-9 | A | 0.17 | 0.16 |
| 116 | LMO S-10 | S-10 | LTO S-10 | A | 0.19 | 0.18 |
| 117 | NMC S-11 | S-11 | Graphite S-11 | A | 0.32 | 0.30 |
| c11 | — | T-1 | — | E | 0.08 | 0.02 |
| c12 | — | T-2 | — | E | 0.14 | 0.05 |
| c13 | — | T-3 | — | D | 0.07 | 0.02 |
| c14 | — | T-4 | — | D | 0.08 | 0.03 |

<Note of Table 2>
LMO: $LiMn_2O_4$ Lithium manganese oxide
LTO: $Li_4Ti_5O_{12}$ Lithium titanate
LCO: $LiCoO_2$ Lithium cobalt oxide
NMC: $Li(Ni_{1/3}Mn_{1/3}Co_{1/3})O_2$ nickel, mangane, and lithium cobalt oxide As clearly seen from the results presented in Table 2, the electrode sheet for secondary battery using the solid electrolyte composition according to the invention and the laminated battery had excellent binding properties and had excellent ion conductivity in the non-pressurization state. Accordingly, in the preferable embodiment, at the time with handling of the electrode sheet in the manufacturing, the peeling of the solid electrolyte and the electrode active substance did not occur, the electrochemical contact of the solid interface was able to be maintained. Therefore, a mechanism of pressurizing electrodes was not required, and it was expected that the cyclability was favorable.

Particularly, it was understood that the polymer having the polar functional group easily ionically interacted with a surface hydrophilic group of the inorganic solid electrolyte and had excellent binding properties compared with a polymer without a polar functional group.

Meanwhile, the polymers used in the comparative examples T-1 and T-2 did not have a polar functional group and thus had deteriorated binding properties. The polymer particles used in the comparative examples T-3 and T-4 were not nonspherical and as a result had deteriorated binding properties in the same manner. In all the T-1 to T-4, it was understood that the decrease of the ion conductance under the non-pressurization was remarkable.

It is considered that the nonspherical polymer had excellent binding properties compared with the spherical polymer because binding properties were increased by a great area binding to the inorganic solid electrolyte in the nonspherical polymer due to a flat structure of the surface, an uneven structure, and the like, compared with a small binding area to the inorganic solid electrolyte in the spherical polymer and further by an anchoring effect.

<Measuring of Average Particle Diameter of Polymer>

The average particle diameter of the polymer particles was measured in the following order. A 1 mass % dispersion liquid was prepared by using the polymer particles prepared as above and an arbitrary solvent (basically, a dispersion medium used in the preparation of the solid electrolyte composition). The volume average particle diameter of the resin particles was measured by using the dispersion liquid sample and a laser diffracting/scattering-type particle size distribution analyzer LA-920 (manufactured by HORIBA, Ltd.). A cumulative distribution curve of the particles was also measured in the same manner, and the particle diameters of d10, d50, and d90 were read, so as to calculate the variations.

<Flatness of Particles>

The flatness of the polymer particles was calculated by an image treatment with electron microscope images. 50 average values were employed.

A scanning type electron microscope (SEM) (XL30 manufactured by Koninklijke Philips N.V.) was used so as to capture scanning type electron microscope (SEM) images in three arbitrary fields of view in 1,000 times to 3,000 times, the scanning type electron microscope (SEM) images were converted to BMP files, particles were obtained by using an application of an "A-ZO KUN" which was an integrated application of IP-1000PC manufactured by Asahi Engineering Co., Ltd., particles analysis were performed in the number of samples of 50, and the flatness was calculated by reading the maximum value and the minimum value of the length.

Specifically, the calculation was performed in the following order.

First, 50 particles were obtained from the SEM image with "A-ZO KUN".

The average value of the maximum lengths of 40 points except for five upper and five lower points among the 50 particles was defined as the maximum length MaxL of the Feret diameter.

The average value of the minimum lengths of 40 points except for five upper and five lower points among the 50 particles was defined as the minimum length MinL of the Feret diameter.

The average value of the areas of 40 points except for five upper and five lower points among 50 particles was defined as a particle area S, and a Heywood diameter HD was calculated by using this according to a complete circle area expression $S=\pi(HD/2)^2$.

The "flatness f1 using the maximum and the minimum" was calculated by f1=MaxL/MinL.

The "flatness f2 using the Feret diameter and the Heywood diameter" was calculated by f2=Max L/HD.

<Method for Measuring Tg>

The glass transition points were measured in the following conditions by using the dry samples above and using the differential scanning calorimeter (manufactured by Sii Technologies Private Limited, DSC7000). The measurement was performed twice with the same samples and the second measurement results were employed.

Atmosphere in the measurement chamber: Nitrogen (50 mL/min)

Temperature elevation speed: 5° C./min

Measuring initiation temperature: −100° C.

Measuring termination temperature: 200° C.

Sample pan: Aluminum pan

Mass of measurement sample: 5 mg

Measuring of Tg: Intermediate temperature of lowering starting point and lowering ending point of DSC chart The same tests as above were performed with respect to A-11, A-19, A-23, A-26, A-34, A-36, A-37, A-39, A-43, A-44, A-49, and A-54, instead of the polymer A-1 used in the test No. 1. As a result, all maintained favorable ion conductance after the pressurization. With respect to the binding properties, A-26 to A-54 having the amide group showed a result "A" and the others showed results "B".

The invention is described with reference to specific embodiments, but, unless described otherwise, it is clear that any details of the invention which are not particularly designated are not intended to limit the invention, and it is obvious that the embodiments are widely construed without departing from the spirit and the scope of the invention recited in the accompanying claims.

1: negative electrode collector
2: negative electrode active substance layer
3: inorganic solid electrolyte layer
4: positive electrode active substance layer
5: positive electrode collector
6: operating position
10: all-solid-state secondary battery
11: upper support plate
12: lower support plate
13: coin battery
14: coin case
15: electrode sheet
S: screw

What is claimed is:

1. A solid electrolyte composition comprising:

nonspherical polymer particles;

a dispersion medium; and an inorganic solid electrolyte, wherein the nonspherical polymer particles are formed of a polymer having at least one of a functional group selected from a group of functional groups a, an acidic group having an acid dissociation constant pKa of 14 or less, or a basic group having a conjugate acid pKa of 14 or less, and wherein an average particle diameter of the nonspherical polymer particles is 0.1 μm or greater and 5 μm or less, wherein the group of functional groups a is a substituent or a linking group, wherein the substituent is a carboxyl group, a sulfonic acid group, a phosphoric acid group, a hydroxy group, $CONR^N_2$, a cyano group, $NR^N_2$, or a thiol group, wherein the linking group is a carbonyloxy group, a carbonyl group, $NR^N$, S, O, $CONR^N$, OCOO, $NR^N$-COO, or a urea group, wherein $R^N$ represents a hydrogen atom, an alkyl group, or an aryl group, wherein flatness of the nonspherical polymer particles is 1.2 or greater, and wherein the polymer for forming the nonspherical polymer particles includes at least a repeating unit of Formula (1) below, (1)

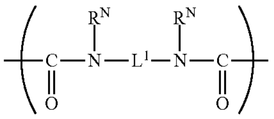

wherein $L^1$ represents an alkylene group having 1 to 20 carbon atoms or an arylene group having 6 to 22 carbon atoms, and $R^N$ represents a hydrogen atom, an alkyl group, or an aryl group.

2. The solid electrolyte composition according to claim 1, wherein a glass transition temperature of the nonspherical polymer particles is −50° C. to 50° C.

3. A solid electrolyte composition comprising:

nonspherical polymer particles;

a dispersion medium; and an inorganic solid electrolyte, wherein the nonspherical polymer particles are formed of a polymer having at least one of a functional group selected from a group of functional groups a, an acidic group having an acid dissociation constant pKa of 14 or less, or a basic group having a conjugate acid pKa of 14 or less, wherein the group of functional groups a is a substituent or a linking group, wherein the substituent is a carboxyl group, a sulfonic acid group, a phosphoric acid group, a hydroxy group, $CONR^N_2$, a cyano group, $NR^N_2$, or a thiol group, wherein the linking group is a carbonyloxy group, a carbonyl group, $NR^N$, S, O, $CONR^N$, OCOO, $NR^N$-COO, or a urea group, wherein $R^N$ represents a hydrogen atom, an alkyl group, or an aryl group, wherein flatness of the nonspherical polymer particles is 1.2 or greater, wherein a polymer for forming the nonspherical polymer particles has a polyalkylene oxide chain, a polycarbonate chain, a polyester chain, or a polysiloxane chain of which a weight average molecular weight is 200 or greater, and wherein the polymer for forming the nonspherical polymer particles includes at least a repeating unit of Formula (1) below, (1)

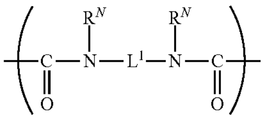

wherein $L^1$ represents an alkylene group having 1 to 20 carbon atoms or an arylene group having 6 to 22 carbon atoms, and $R^N$ represents a hydrogen atom, an alkyl group, or an aryl group.

4. The solid electrolyte composition according to claim 1, wherein the polymer for forming the nonspherical polymer particles has a crosslinkable group.

5. The solid electrolyte composition according to claim 1, wherein a boiling point of the dispersion medium at a normal pressure is 80° C. to 220° C.

6. The solid electrolyte composition according to claim 1, wherein solubility of the dispersion medium in water is 5 mass % or less at 20° C.

7. The solid electrolyte composition according to claim 1, wherein a content of the nonspherical polymer particles is 0.1 parts by mass to 10 parts by mass with respect to 100 parts by mass of the inorganic solid electrolyte.

8. The solid electrolyte composition according to claim 1, further comprising:

an active substance that can insert or release ion of metal belonging to Group 1 or 2 of the periodic table.

9. The solid electrolyte composition according to claim 1, wherein the inorganic solid electrolyte is a sulfide-based inorganic solid electrolyte.

10. A method for manufacturing the solid electrolyte composition of claim 1, comprising:

a first step of mixing and mechanically dispersing nonspherical polymer particles and a dispersion medium below to form slurry liquid of nonspherical polymer particles; and a second step of further mechanically dispersing a slurry liquid of polymer particles obtained as above in presence of an inorganic solid electrolyte, wherein the nonspherical polymer particles are formed of a polymer having at least one of a functional group selected from a group of functional groups a, an acidic group having an acid dissociation constant pKa of 14 or less, or a basic group having a conjugate acid pKa of 14 or less, and wherein an average particle diameter of the nonspherical polymer particles is 0.1 μm or greater and 5 μm or less, wherein the group of functional groups a is a substituent or a linking group, wherein the substituent is a carboxyl group, a sulfonic acid group, a phosphoric acid group, a hydroxy group, $CONR^N_2$, a cyano group, $NR^N_2$, or a thiol group, wherein the linking group is a carbonyloxy group, a carbonyl group, $NR^N$, S, O, $CONR^N$, OCOO, $NR^N$-COO, or a urea group, wherein $R^N$ represents a hydrogen atom, an alkyl group, or an aryl group, wherein flatness of the nonspherical polymer particles is 1.2 or greater, and wherein the polymer for forming the nonspherical polymer particles includes at least a repeating unit of Formula (1) below,

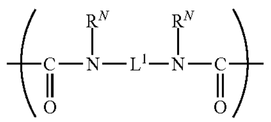

(1)

wherein $L^1$ represents an alkylene group having 1 to 20 carbon atoms or an arylene group having 6 to 22 carbon atoms, and $R^N$ represents a hydrogen atom, an alkyl group, or an aryl group.

11. The method for manufacturing the solid electrolyte composition according to claim 10, wherein the mechanical dispersion in the first step and/or the second step is performed by a ball mill dispersion method.

12. An electrode sheet for a battery comprising:

the solid electrolyte composition according to claim 1.

13. A method for manufacturing an electrode sheet for a battery, comprising:

a third step of applying the solid electrolyte composition according to claim 1 to a collector and heating the solid electrolyte composition to a temperature of the glass transition temperature or greater of the nonspherical polymer particles.

14. An all-solid-state secondary battery comprising:

the electrode sheet for a battery according to claim 12.

* * * * *